United States Patent
Snyder

(10) Patent No.: US 6,266,064 B1
(45) Date of Patent: Jul. 24, 2001

(54) COHERENT VISIBILITY SORTING AND OCCLUSION CYCLE DETECTION FOR DYNAMIC AGGREGATE GEOMETRY

(75) Inventor: John Snyder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/086,965

(22) Filed: May 29, 1998

(51) Int. Cl.[7] .................................................. G06T 15/40
(52) U.S. Cl. .......................... 345/421; 345/423; 345/427; 345/953; 345/958
(58) Field of Search .................................. 345/958, 422, 345/421, 419, 423, 427, 953

(56) References Cited

U.S. PATENT DOCUMENTS

| | | | |
|---|---|---|---|
| 4,888,707 | * 12/1989 | Shimada | 345/958 |
| 5,579,455 | * 11/1996 | Greene et al. | 345/422 |
| 5,734,806 | * 3/1998 | Narayanaswami | 345/422 |
| 5,872,570 | * 2/1999 | Otto | 345/421 |
| 5,914,721 | * 6/1999 | Lim | 345/421 |

OTHER PUBLICATIONS

Cook, R. L., "Shade Trees," *Computer Graphics*, 18:3, 223–231 (Jul. 1984).

Dorsey et al., "Interactive Design of Complex Time–Dependent Lighting," *IEEE Computer Graphics and Applications*, 26–36 (Mar. 1995).

Guenter, et al., "Specializing Shaders," *Computer Graphics Proceedings*, Annual Conference Series, 343–350 (1995).

Hanrahan et al., "A Language for Shading and Lighting Calculations," *Computer Graphics*, 24:4, 289–298 (Aug. 1990).

Meier, B. J., "Painterly Rendering for Animation," *Computer Graphics Proceedings*, Annual Conference Series, 477–484 (1996).

Porter, et al., "Compositing Digital Images," *Computer Graphics*, 18:3, 253–259 (Jul. 1984).

Segal, et al., "Fast Shadows and Lighting Effects Using Texture Mapping," *Computer Graphics*, 26:2, 249–252 (Jul. 1992).

Regan, Matthew and Ronald Pose, "Priority Rendering With a Virtual Reality Address Recalculation Pipeline", *ACM SIGGRAPH '94, Computer Graphics Proceedings, Annual Conference Series*, pp. 155–162, 1994.

Regan, Matthew and Ronald Pose, "Low Latency Virtual Reality Display System", *Technical Report No. 92/166,* Monash University, Victoria, Australia, pp. 1–13, Sep., 1992.

Regan, Matthew and Ronald Pose, "A Interactive Graphics Display Architecture", *IEEE Virtual Reality*, 1993 International Symposium, pp. 293–299, 1993.

James F. Blinn, "Compositing, Part 1: Theory", *IEEE Computer Graphics and Applications*, pp. 83–87, Sep., 1994.

James F. Blinn, "Compositing, Part 2: Practice", *IEEE Computer Graphics and Applications*, pp. 78–82, Nov., 1994.

Kelvin Chung Tat Leung, "An Efficient Collision Detection Algorithm for Polytopes in Virtual Environments", The University of Hong Kong, Thesis, 1996.

* cited by examiner

Primary Examiner—Mark Zimmerman
Assistant Examiner—Kimbinh T. Nguyen
(74) Attorney, Agent, or Firm—Klarquist Sparkman Campbell Leigh & Whinston, LLP

(57) ABSTRACT

A visibility sorting method coherently computes a visibility ordering of a collection of moving objects seen by a moving camera in an animated graphics scene. The method detects whether an object occludes other objects. Objects that form an occlusion cycle are grouped together in the ordering. Objects are represented using convex polyhedra to facilitate occlusion testing. A fast occlusion test determines whether the spatial and angular extents of the convex polyhedra overlap. An exact occlusion test detects collisions between convex polyhedra and the silhouettes of the convex polyhedra.

35 Claims, 20 Drawing Sheets

COHERENT VISIBILITY SORTING AND OCCLUSION CYCLE DETECTION FOR DYNAMIC AGGREGATE GEOMETRY

FIELD OF THE INVENTION

The invention generally relates to computer generated graphics and more specifically relates to visible surface determination and occlusion cycle detection for graphical objects in a graphics scene.

BACKGROUND OF THE INVENTION

In the field of computer-generated graphics, three-dimensional ("3D") objects in a graphics scene are represented by data structures called object models. These models represent the surface of an object using a surface model such as a polygon mesh, parametric surface or quadric surface. The surface model defines the location of points on an object's surface in 3D space, normally the local coordinate system of the object model. For example, a polygon mesh consists of a collection of geometric primitives such as edges, vertices, and faces (polygons). The object model also stores attributes of the surface such as its color, texture and shading. In a polygon mesh, attributes are typically stored at the vertices of the surface polygons.

To generate a two-dimensional image from the graphical objects and their attributes in a graphics scene, the object models are rendered with respect to a viewing specification, which defines the position of a camera (the eye point) and the two-dimensional coordinate space of the image often called "screen coordinates." In the rendering process, a geometry processing stage transforms the object geometry to world coordinates, a coordinate system for the scene, and then to the screen coordinates, a 2D coordinate system representing the location of pixel elements or pixels in an output image. To compute a 2D image, the surface polygons are scan converted into pixels values (e.g., RGB color values), typically by interpolating attributes stored at the polygon's vertices to pixel locations in screen coordinates.

In real time graphics applications, the graphics scene changes over time, usually in response to user input. The appearance and position of the objects change from one frame to the next, and the camera position changes as well. As objects move around the scene, some surfaces become visible while others are occluded. To enhance realism, the output image has to be recomputed several times a second, usually at a rate of 12 Hz or more. Due to this rigorous time constraint, rendering computations must be very fast and efficient.

One important part of the rendering process is referred to as visible surface determination (also referred to as "hidden surface removal"). Visible surface determination is the process of determining which surfaces of the objects in a scene are visible from the perspective of the camera. The graphics rendering pipeline uses a method for visible surface determination to identify which surfaces are visible and should contribute to the pixel values in the output image.

There are a variety of methods for performing visible surface determination. One way is to "paint" the polygons into the frame buffer in order of decreasing distance from the viewpoint (the location of the scene's camera, also referred to as the eye point). See Newell, M. E., R. G. Newell, and T. L. Sancha, "A Solution to the Hidden Surface Problem," *Proc. ACM National Conf.*, 1972, which discloses a method for performing hidden surface removal called "NNS" in the following discussion.

NNS sorts a set of polygons by furthest depth and tests whether the resulting order is actually a visibility ordering. The depth-sorted list of polygons is traversed: if the next polygon does not overlap in depth with the remaining polygons in the list it can be removed and placed in the ordered output. Otherwise, the collection of polygons that overlap in depth must be further examined using a series of occlusion tests of increasing complexity. If the polygon does not occlude any of these overlapping polygons, it can be sent to the output; otherwise, it is marked and reinserted behind the overlapping polygons. When such a marked polygon is again encountered, a cyclic occlusion is indicated and the polygon is split to remove the cycle.

The following steps summarize the test for occluders at the polygon level:

a. Perform z overlap test.

b. Test the x coordinate of screen bounding boxes of a pair of overlapping polygons, P and Q (if disjoint, neither polygon occludes the other).

c. Test the y coordinate of screen bounding boxes (same as above).

d. Test the vertices of P in plane of Q, and if all are behind this plane from the eye, then P cannot occlude Q.

e. Test vertices of Q in plane of P, and if all are in front of this plane (with respect to the eyepoint), then P cannot occlude Q.

f. Do an exact test for screen overlap between P and Q.

While the NNS algorithm is an effective method for visible surface determination at the polygon level, it has a number of drawbacks. First, it does not perform a visibility sort on objects, e.g., graphical objects comprising many interconnected polygons. In fact, the special sort to resolve visibility between polygons with overlapping z only works for polygons and not aggregate sets of polygons. Second, it does not perform visibility sorting coherently. The term "coherent" in this context refers to using the results of a previous visibility ordering to reduce the overhead of the computation for each re-calculation of visibility ordering. A "coherent" method is incremental in the sense that results from the previous iteration of the visibility sort or occlusion detection routine are used as a starting point for the next iteration. In graphics applications where objects and the camera have motion that is substantially continuous, the last iteration will provide a good starting point for the next iteration because the changes in object and camera positions are likely to be small. This is critical in animated scenes where visibility is typically re-computed for every frame, or at least each time the output image or parts of it are updated. In real time applications where output images are generated at least at a rate of 12 Hz, it is essential that the visibility sort be fast and efficient so that more computational resources (e.g., memory and processor cycles) can be allocated to generating realistic images.

The NNS approach has less coherence because it performs a depth sort each time rather than starting from the visibility sorted list from the previous frame. As such, it does not take advantage of coherence of the previous visibility sort. In addition, the NNS approach is inefficient because it repeats expensive occlusion tests on polygons and has to adjust the ordering of polygons when the depth sort is not the same as a visibility ordering of the polygons.

It is important to note that a depth sort does not necessarily imply that the depth sorted objects or polygons are in visibility order. FIG. 1 shows an example of a case where the minimum depth ordering of objects A and B does not provide an accurate visibility ordering of these objects.

While the minimum depth of object B is smaller than the minimum depth of object A with respect to the eye point E ($z_A<z_B$), A still occludes B.

A visibility ordering on objects identifies the occlusion relationship among the objects. A visibility sort can be "front-to-back", in which case no object in a visibility ordering of the objects is occluded by any objects following it in the ordering. A visibility sort may also be "back-to-front", in which case no object in the ordering occludes any object following it. A third drawback of the NNS approach is that it resolves cyclic occlusions by splitting geometry. While an analog of polygon splitting exists for aggregate polyhedral objects, it is an expensive operation to split such objects, since the subset of polygons that require splitting must be computed and then each polygon in the subset, typically containing many polygons, must be split. A more practical approach is to simply detect the cyclic occlusions so that the aggregate objects forming the cycle can be handled specially. For example, in layered rendering systems, objects forming occlusion cycles can be grouped into a single layer so that the hardware z-buffer is used to resolve occlusions.

There are number of important applications where it is useful to have a visibility ordering of objects rather than individual polygons. A visibility ordering of objects is particularly useful in applications where the object geometry in a scene is factored into separate layers (e.g., factoring foreground and background objects to separate layers). In these applications, factored layers are combined in a function called image compositing to produce output images. One principal advantage of constructing images in layers is that it enables parts of a scene to be rendered at independent update rates with independent quality parameters (e.g., shading complexity, spatial resolution, etc.). Due to the constraints of real time image generation, there is a need for new methods for performing occlusion detection and visibility sorting on moving objects that are efficient and take advantage of coherence.

SUMMARY OF THE INVENTION

The invention is a method for performing a visibility sort of aggregate geometry in computer generated graphics applications. The method detects occlusion cycles on instances of aggregate geometry. Rather than splitting polygons into smaller pieces to remove occlusion cycles, it groups instances of aggregate geometry in an occlusion cycle together. An instance of aggregate geometry most commonly applies to a set of polygons representing an object in a scene, but is not limited to this case.

One version of the visibility sorting method employs convex polyhedra that bound each object in a scene to facilitate fast, non-exact occlusion detection, and slower, but exact occlusion detection. The method is fast enough to be used in dynamic applications such as real time computer graphics, and is particularly useful in ordering objects so that rendered image layers of each object can be composited into an output image. When objects are sorted using this method, the hidden surfaces can be removed simply by overlaying the rendered image layers in front to back order. The method exploits coherence in moving objects and camera positions by maintaining information from one iteration of the sort to the next in a manner that reduces computation time for performing the visibility sort and occlusion detection.

Additional features and advantages of the invention will become more apparent from the following detailed description and accompanying drawings.

DETAILED DESCRIPTION

Introduction

Figure 1:
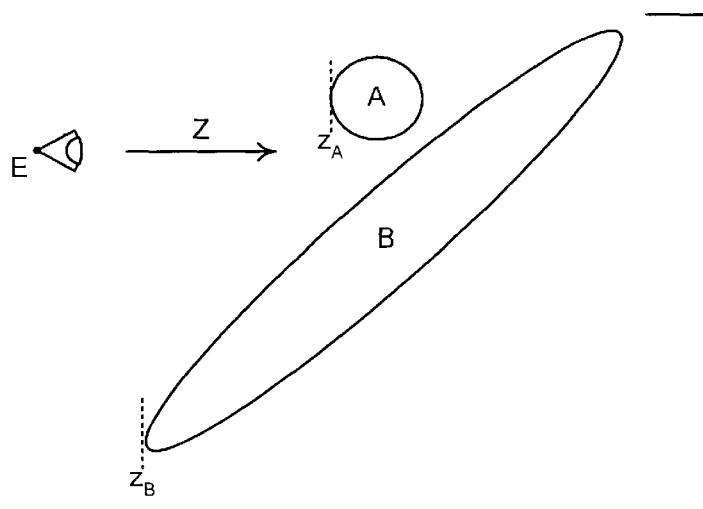
FIG. 1 is a diagram illustrating why the minimum depths of objects with respect to the eye point are not an accurate indicator of visibility.

The invention provides a method for coherently computing a visibility ordering of a collection of moving objects seen by a moving camera in a graphics scene. This method is referred to as a Coherent Visibility Sort (CVS). The CVS method sorts aggregate geometry, such as a graphical object, comprising many polygons or other geometric primitives. For clarity, the following description uses the term "object" to encompass instances of aggregate geometry, even if the aggregate geometry does not form an entire object model. The output of the method is an ordering of objects with respect to the camera (or eye point) of the scene.

It is possible that some of the objects form an occlusion cycle, or in other words, are mutually occluding. Objects forming an occlusion cycle cannot be sorted. To address this constraint, the CVS method detects occlusion cycles and groups the objects in an occlusion cycle together for the purpose of computing the visibility ordering.

The CVS method computes a front-to-back visibility ordering of objects in a graphics scene. Note that the sort is performed at the object level and does not necessarily result in a depth-sorted list of objects. Each of the objects (or grouped objects in an occlusion cycle) can be rendered to an image layer. The visibility ordering reduces the hidden surface problem to overlaying each of these image layers to form a composite image for display. There are a number of applications of the CVS method in the fields of computer generated graphics and image processing. Some applications are listed below:

1) Rendering acceleration—by using image warping techniques to approximate the appearance of the moving object as seen by the moving camera, rendering resources can be conserved. In this application, the moving objects are visibility sorted so that their corresponding image layers can be composited 2) Object-based image stream compression—segmenting a synthetic image stream into visibility-sorted layers yields greater compression by exploiting the greater coherence present in the segmented layers.

3) Special effects generation—effects such as motion blur and depth-of-field can be computed via image post-processing on each layer. This is simplified when the depth of field or motion blur to be applied is well-approximated as a constant for each layer.

4) Animation playback with selective display—by storing the image layers associated with each object and the visibility ordering of these layers, layers may be selectively added or removed to allow interactive insertion/deletion of scene elements with low latency.

5) Incorporation of 2D image streams—external image streams, such as hand-drawn character animation or recorded video, can be inserted into a 3D animation using a geometric proxy which is ordered along with the 3D synthetic elements, but drawn using the 2D image stream.

6) Rendering with transparency—while standard z-buffers fail to properly render arbitrarily ordered transparent objects, visibility sorting solves this problem, provided the (possibly grouped) objects themselves can be properly rendered. For example, ungrouped convex transparent objects can be rendered back-to-front by rendering first the back-facing polygons and then the front-facing.

7) Combined collision detection and visibility sorting—the CVS method performs many of the steps required to do collision detection (tracking of transformed object extents, identification of overlapping hulls, etc.), so the incremental cost of doing both collision detection and CVS is low.

8) Sprite assignment via CVS preprocess—the CVS runtime enables the efficient use Gf image layers, but the question of how to assign geometry to the lowest level objects considered by the CVS runtime is left for the application author. However, the CVS method may also be used as a preprocessing step on the scene database to determine the low-level object assignment. By splitting the geometry of the scene database to a much finer granularity than will be used at run-time, and then applying the CVS method (at low frame rate) over a sampling of the application configurations, a partition of the geometry into low-level objects can be made.

It is worth noting that rendering without a z-buffer is not an explicitly targeted application. The CVS method does not specifically address hidden surface elimination within each layer, but instead focuses on the problem of ordering/occlusion cycle detection between instances of aggregate geometry rendered to separate layers. Nevertheless, some of the methods described here may prove useful for rendering without or with reduced use of z-buffers, in order to decompose the hidden-surface problem for the whole scene into smaller sub- problems.

The Occlusion Relation and Directed Graphs The central notation for visibility sorting is the occlusion relation between two instances of aggregate geometry, such as objects A and B. The following description uses the notation $A \rightarrow_E B$, meaning object A occludes object B with respect to the eye point E. Mathematically, this relation signifies that a ray emanating from E exists such that the ray intersects A and then B. It is useful to make the dependence on the eye point implicit so that $A \rightarrow B$ means that A occludes B with respect to an implicit eye point. Note that the arrow "points" to the object that is occluded.

The set of occlusion relations between pairs of the n objects comprising the entire scene forms a directed graph, called the occlusion graph. FIGS. 2–4 illustrates some example occlusion graphs.

Figure 2A:
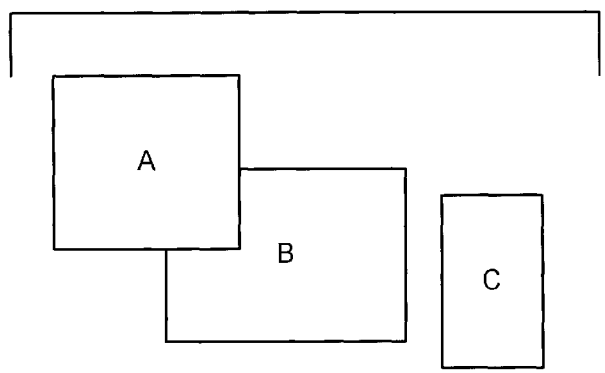
FIG. 2A is a diagram of objects in a scene from the perspective of the eye point.
Figure 2B:
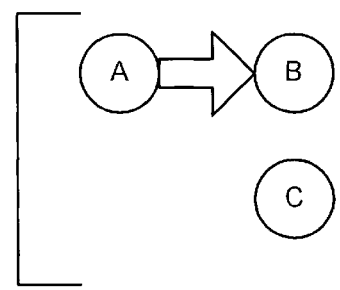
FIG. 2B is a corresponding directed graph representing the occlusion relationship of the objects in FIG. 2A.
Figure 3A:
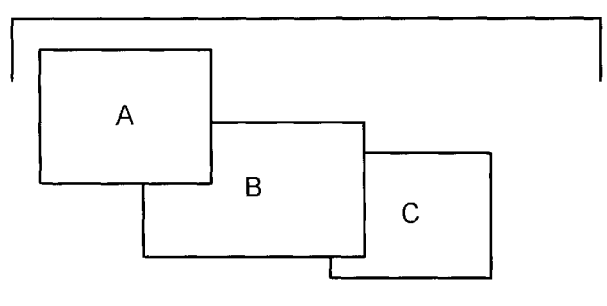
FIG. 3A is a diagram of objects in a scene from the perspective of the eye point.
Figure 3B:
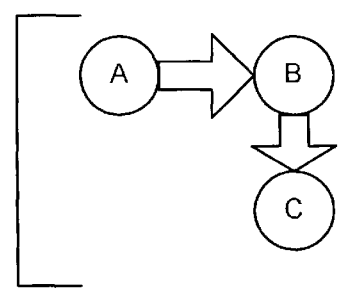
FIG. 3B is a corresponding directed graph representing the occlusion relationship of the objects in FIG. 3A.

FIG. 2A illustrates a simple example including three objects A, B, and C, where object A occludes object B, but neither A or B occludes C. FIG. 2B shows the occlusion graph for the example in FIG. 2A. In the example shown in FIG. 3A, object A occludes B, and B occludes C. FIG. 3B shows the occlusion graph for the example scene in FIG. 3A. Note that the occlusion graph is acyclic in both of these examples.

Figure 4A:
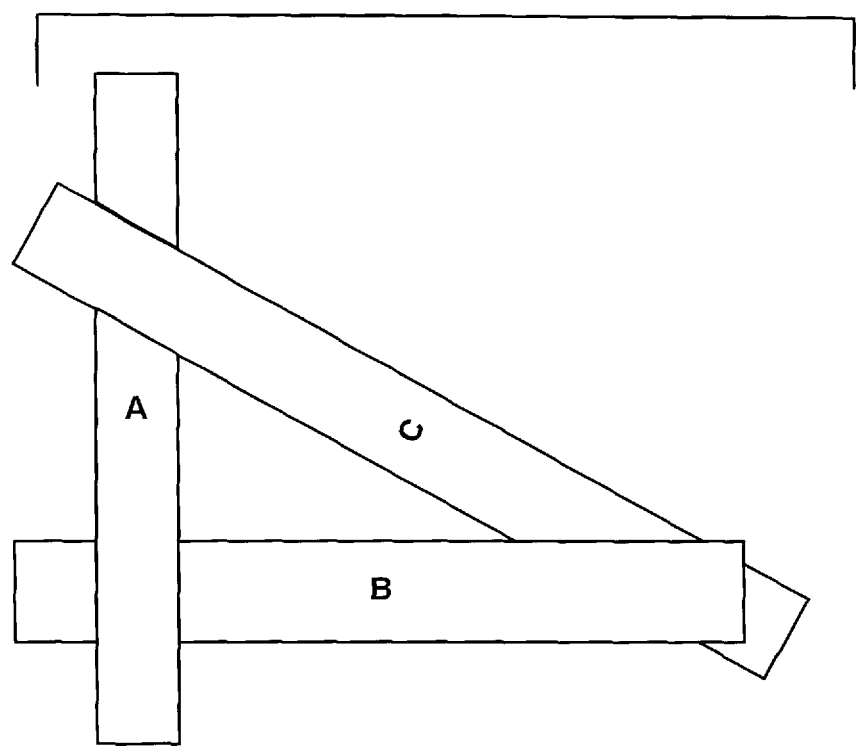
FIG. 4A is a diagram of objects in a scene from the perspective of the eye point.
Figure 4B:
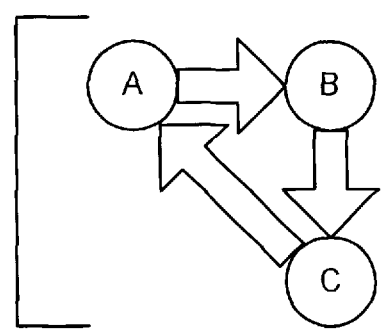
FIG. 4B is a corresponding directed graph representing the occlusion relationship of the objects in FIG. 4A.

In contrast to the example scenes in FIGS. 2 and 3, the objects in the example scene of FIG. 4A form an occlusion cycle. As shown in the occlusion graph of FIG. 4B, object A occludes B. B occludes C, and C occludes A.

When the directed occlusion graph is acyclic, visibility sorting is equivalent to topological sorting of the occlusion graph, and produces a front-to-back ordering of the objects $O_1, O_2, \ldots O_n$ such that i<j implies $O_j$ does not occlude $O_i$. Objects so ordered can thus be rendered with correct hidden surface elimination simply by using "Painter's algorithm"; i.e., by rendering $O_n$ followed by $O_{n-1}$ and so on until $O_1$. Cycles in the occlusion graph mean that no visibility ordering exists.

A Coherent Visibility Sort Method

One implementation of the CVS method uses a convex bounding hull on each of the n objects to be sorted. At each sort query, a 3×3 linear transformation, its inverse, and a 3D translation are supplied for each object, along with a representation for the camera. The method returns a front-to-back ordered list of objects where occlusion cycles have been grouped. The occlusion graph for objects in each cycle is also available as the result of this computation. The method also works on objects represented as the union of a set of convex bounding hulls as well as a single convex bounding hull. The benefit of representing objects with a set of bounding hulls is that the objects can be bound more tightly with more than one bounding hull, thus generating fewer occlusions.

Convex polyhedra provide several advantages in this context. Extremal vertices with respect to directions and angles can be computed with simple downhill sliding along vertices of the hull. By using the extremal vertex found in the last sort query as the starting point for the current one, coherent changes to the object's transformation and/or the camera can be tracked, usually by visiting few vertices on the hull. Inclusion of the eye point E (camera optical center) within the hull can be also tracked using an incremental algorithm. Finally, collisions between hulls and between their silhouette projections can be incrementally tracked for convex polyhedra, providing an exact test for occlusion between a pair of convex bodies. The routines for tracking changes in the convex hull and detecting occlusion take the same approach of starting with information saved from the last query to incrementally arrive at the new solution, exploiting coherence in object and camera motions.

Figure 5A:
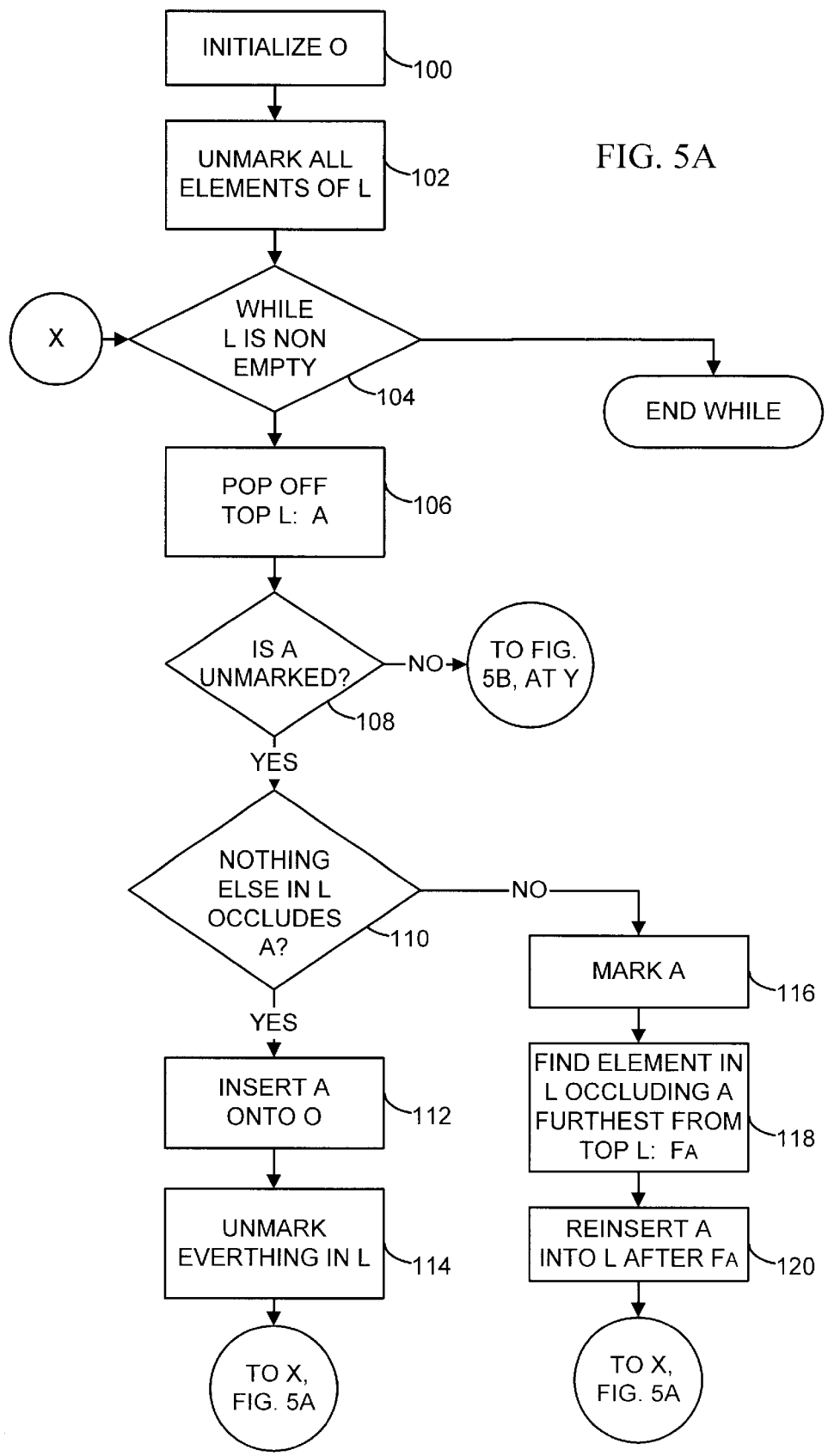
FIGS. 5A and 5B illustrate a flow diagram of an implementation of a coherent visibility sort method designed according to the invention.
Figure 5B:
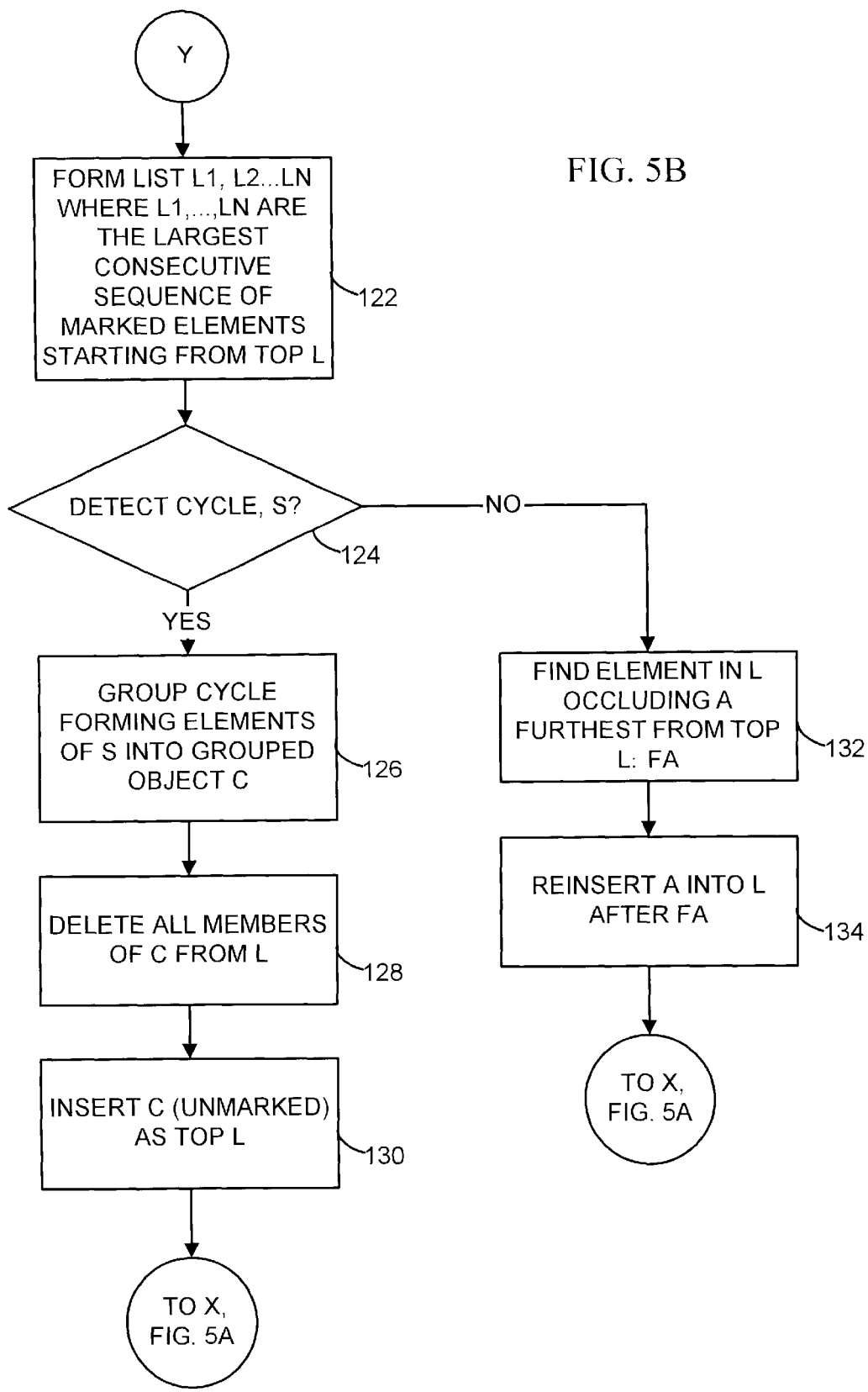

A pseudo-code listing of an implementation of the CVS method appears below. FIGS. 5A and 5B show a flow diagram depicting this method. The reference numbers inserted along with the pseudo-code version below correspond to functional blocks in FIGS. 5A and 5B.

Input: ordering of non-grouped objects from previous invocation L

Output: front-to-back ordering with cyclic elements grouped together O

```
O←∅(100)
unmark all elements of L (102)
while L is nonempty (104)
    pop off topL: A (106)
    if A is unmarked (108)
        if nothing else in L occludes A (110)
            insert A onto O (112)
            unmark everything in L (114)
        else
            [reinsert A onto L]
            markA (116)
                find element in L occluding A furthest from topL:
                F_A (118)
                reinsert A into L after F_A (120)
        endif
    else [A is marked]
        form list S: A, L_1, L_2, ..., L_n where L_1, ... L_n
            are the largest consecutive sequence of marked elements,
            starting from topL (122)
        if DetectCycle(S) then (124)
            [insert cycle as grouped object onto L]
            group cycle-forming elements of S into grouped object
            C (126).
            delete all members of C from L (128)
            insert C (unmarked) as topL (130)
        else
            [reinsert A onto L]
            find element in L occluding A furthest from topL:
            F_A (132)
            reinsert A into L after F_A (134)
        endif
    endif
endwhile
```

In performing the visibility sort on objects, the CVS method detects occlusion cycles among objects in the list. A pseudo-code description of the occlusion detection method is set forth below.

Detect Cycle (finds an occlusion cycle)
Input: list of objects $S \equiv <S_1, S_2, \ldots, S_n>$
Output: determination of existence of a cycle and a list of cycle-forming objects, if a cycle

```
If n ≤ 1 return NO_CYCLE
i_1 ← 1
for p = 2 to n+1
    if Si_k occludes Si_(p-1) for k < p-1 then
        cycle is Si_k, Si_(k+1), ..., Si_(p-1)
        return CYCLE
    else if no occluder of Si_(p-1) exists in S then
        return NO_CYCLE
    else
        let Sk be an occluder of Si_(p-1)
        i_p ← k
    endif
endfor
```

The CVS method computes an incremental topological sort on the strongly connected components of the directed occlusion graph. A strongly connected component (SCC) in the occlusion graph is a set of mutually occluding objects, in that for any object pair A and B in the SCC, either A→B or there exist objects, $X_1, X_2, \ldots X_s$ also in the SCC such that $$A \to X_1 \to X_2 \to \ldots \to X_s \to B$$

An SCC in the occlusion graph can not be further decomposed into layerable parts, and thus must be rendered as a group. Marking objects ensures that objects already visited can be grouped into SCCs when they are visited again.

The cycle detection method illustrated above finds a cycle in a cyclically-connected graph. A cyclically-connected occlusion graph is one in which every object is occluded by at least one other object in the graph. In fact, the cycle detection method finds a cycle if any contiguous initial subsequence of objects in the input order, $<S_1, S_2, \ldots S_m>$, $m \leq n$, forms a cyclically-connected sub-graph.

To illustrate the CVS method, consider the following examples using the directed graphs shown in FIGS. 2–4.

TABLE 1

| L | O | Comment |
|---|---|---------|
| ABC | ∅ | Initial State |
| BC | A | Insert A onto O |

TABLE 1-continued

| L | O | Comment |
|---|---|---|
| C | AB | Insert B onto O |
| Ø | ABC | Insert C onto O |

In Table 1, each line shows the state of L and O after an iteration of the While loop, using the initial ordering of ABC for the occlusion graph of FIG. 3.

TABLE 2

| L | O | Comment |
|---|---|---|
| CBA | Ø | initial state |
| BC*A | Ø | mark C and reinsert after B |
| C*AB* | Ø | mark B and reinsert after A |
| AB*C* | Ø | A is unmarked, so reinsert C |
| BC | A | insert A onto O, unmark everything |
| C | AB | insert B onto O |
| Ø | ABC | insert C onto O |

Table 2 illustrates an example of the CVS method on the graph of FIG. 3 with an initial ordering of CBA. The notation "*" is used to denote marking. The step from lines 3 to 4 in the table reinserts C into L because there is an unmarked element A between C and the furthest element occluding it, B.

TABLE 3

| L | O | Comment |
|---|---|---|
| ABC | Ø | initial state |
| BCA* | Ø | mark A and reinsert |
| CA*B* | Ø | mark B and reinsert |
| A*B*C* | Ø | mark C and reinsert |
| (ABC) | Ø | group cycle |
| Ø | (ABC) | insert (ABC) onto O |

Table 3 illustrates an example using the graph of FIG. 4 with initial ordering ABC. The notation (P1,P2, . . . ,Pr) denotes grouping. Since the objects form an occlusion cycle, they are grouped together.

To demonstrate that the CVS method produces a visibility ordered list of objects, consider the following proof, starting with occlusion graphs without cycles. When the method reaches an object A, if nothing still remaining on L occludes A, it simply places A onto the output O. Assuming the method halts, it is easy to see by induction that each next object placed onto the output is placed correctly, since nothing still remaining on L occludes it. To see that the method halts on acyclic graphs, let P be the first (nearest to top) element of L which nothing occludes. P must exist, since otherwise the occlusion graph contains a cycle. There can of course be several objects before P on L, say $Q_1, Q_2, \ldots, Q_n$. The method must reduce the number of objects in front of P, so that it eventually reaches P and places it on the output. To prove this, let the set of objects in front of P be $Q \equiv \{Q_1, Q_2, \ldots Q_n\}$. Every element of Q is occluded by something. But at least one element of Q is occluded by an element not in Q, again since the graph is acyclic. When that element, Q*, is encountered by the CVS method, it will be reinserted behind P, thus reducing the number of elements in front of P. The same argument applies to show that Q* will be reached (i.e., eventually become topL). The elements in front of Q* do not contain a cycle, so their number must be reduced. Note that this number is smaller than the number in front of P, so that an inductive proof can be constructed. For the inductive proof base case, when a single element is in front of Q*, it must be reinserted behind Q*.

To generalize the above result to graphs with cycles, note that if a (possibly grouped) object A is encountered as topL which nothing remaining on L occludes, then A is correctly placed on the output. This is the only time the method inserts an object to the sorted output. To see that the method halts, assume the contrary. Then the method will return from a state $T \equiv \{Q_1, Q_2, \ldots, Q_n\}$ to T again having visited (popped from topL and then reinserted) m elements. That is, $Q_m$ is the furthest element in T's sequence that was visited in progressing from state T through a finite sequence of steps back to T. But since no object was output, all the elements before $Q_m$ from T must also have been visited and are thus marked. Let Q be the set of elements from $Q_1$ to $Q_m$. Since every element in Q was reinserted, but no element was reinserted further than $Q_m$, all elements in Q are occluded by some other element of Q. But then the cycle detection method shown above is guaranteed to find a cycle within elements of Q, leading to the formation of a grouped object. Since there are only a finite number of deletion or grouping operations that can happen on a finite set of elements, the method eventually halts, with the topological sorted list of SCCs.

It can be seen that the CVS method takes advantage of coherence in the sense that when a given object A is next popped off the list, it is likely that few objects further in the list will occlude it. Typically, no objects will be found to occlude A, and it will be immediately inserted onto O. If the method can quickly determine that no objects occlude A, and the new ordering requires no rearrangements, it verifies that the new order is identical to the old with computation essentially linear in the total number of objects (Actually, the routines described here provide a roughly O(log n) rather than an O(1) complexity for finding occluders, resulting in a roughly O(n log n) complexity for the CVS method).

Of course, this assumes that there are no large SCCs in the occlusion graph, which is a reasonable assumption for many scenes. The cycle detection method has at least quadratic complexity in the number of potential cycle elements. Note also that the visibility sorting method does not attempt to exploit coherence in persistent occlusion cycles. In typical scenes, occlusion cycles will likely be small and of limited duration.

As the number of re-arrangements required in the new order increases (i.e., as the coherence of the ordering decreases) the CVS method slows down, until a worst case scenario of starting from what is now a back-to-front ordering achieves $O(n^2)$ performance. This is analogous to using an insertion sort for repeatedly sorting a coherently changing list: typically, the sort is O(n), but can be $O(n^2)$ in highly unlikely, pathological situations.

Occlusion Detection
Fast Occlusion Detection

A fundamental query of the CVS method determines whether any objects not already inserted into the output order occlude a given (possibly grouped) object. To provide a quick occlusion test, the method bounds the spatial extent of the transformed convex hulls with respect to a set of $n_s$ directions, and their angular extent about the current optical center with respect to a set of $n_a$ screen directions. These spatial and angular extents are shown in FIGS. 6 and 7, respectively.

Figure 6:
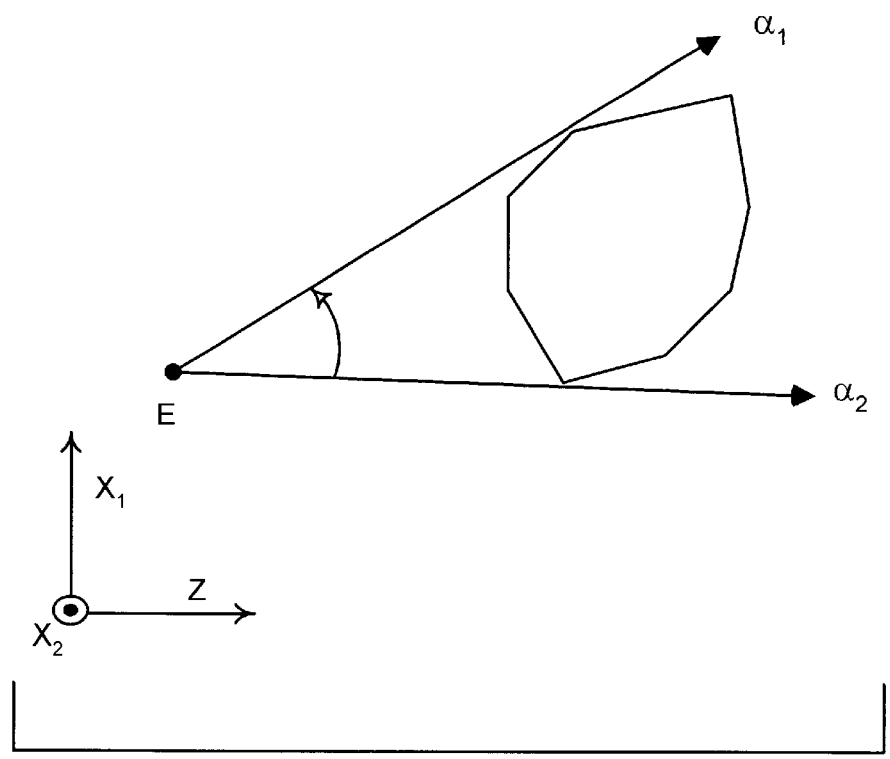
FIG. 6 is a diagram illustrating the angular extent of an object relative to an eye point, E.
Figure 7:
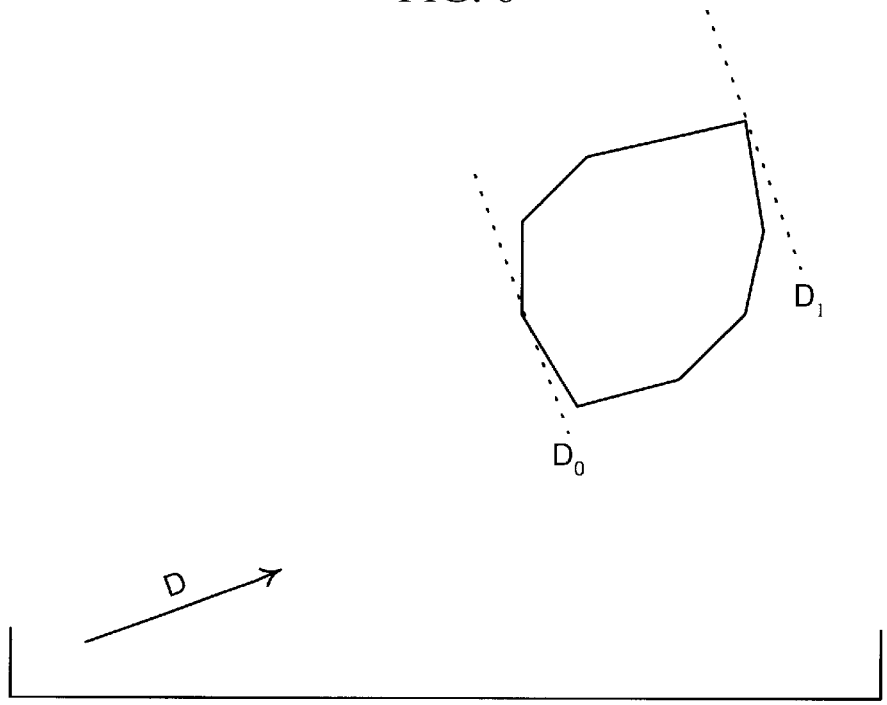
FIG. 7 is a diagram illustrating a spatial extent of an object relative to a direction, D.

As shown in FIG. 6, angular extents are defined with respect to an eye point E and a orthogonal coordinate frame $(X_1, X_2, Z)$, where $X_2$ (out of the page) is perpendicular to the plane in which angles are measured, Z defines the zero angle, and $X_1$ defines an angle of $+\pi/2$ radians. As shown in FIG. 7, spatial extents are defined with respect to a direction D. In either case the resulting extent is simply an interval: $[\alpha_1, \alpha_1]$ for angular extents, and $[D_0, D_1]$ for spatial extents. Spatial extents are defined by extremizing (maximizing and minimizing) a measure of the spatial extent:

$$S(P) \equiv D \cdot P$$

over all points P in the convex hull. Angular extents are defined similarly by extremizing a measure of the angular extent:

$$A(P) \equiv \tan^{-1}\left(\frac{(P-E) \cdot Z}{(P-E) \cdot X_1}\right).$$

When implementing this computation, care should be taken when the denominator is close to 0. This is accomplished by considering the inverse tangent function of two arguments forming the numerator and denominator of the above expression, as is done in the C math library implementation of atan2 When objects in an occlusion cycle are grouped, their $n_s+n_a$ extents are combined by taking the union of the extents of the objects as follows:

$$[a_0,a_1] \cup [b_0, b_1] \equiv [\min(a_0, b_0), \max(a_1,b_1)]$$

Figure 8:
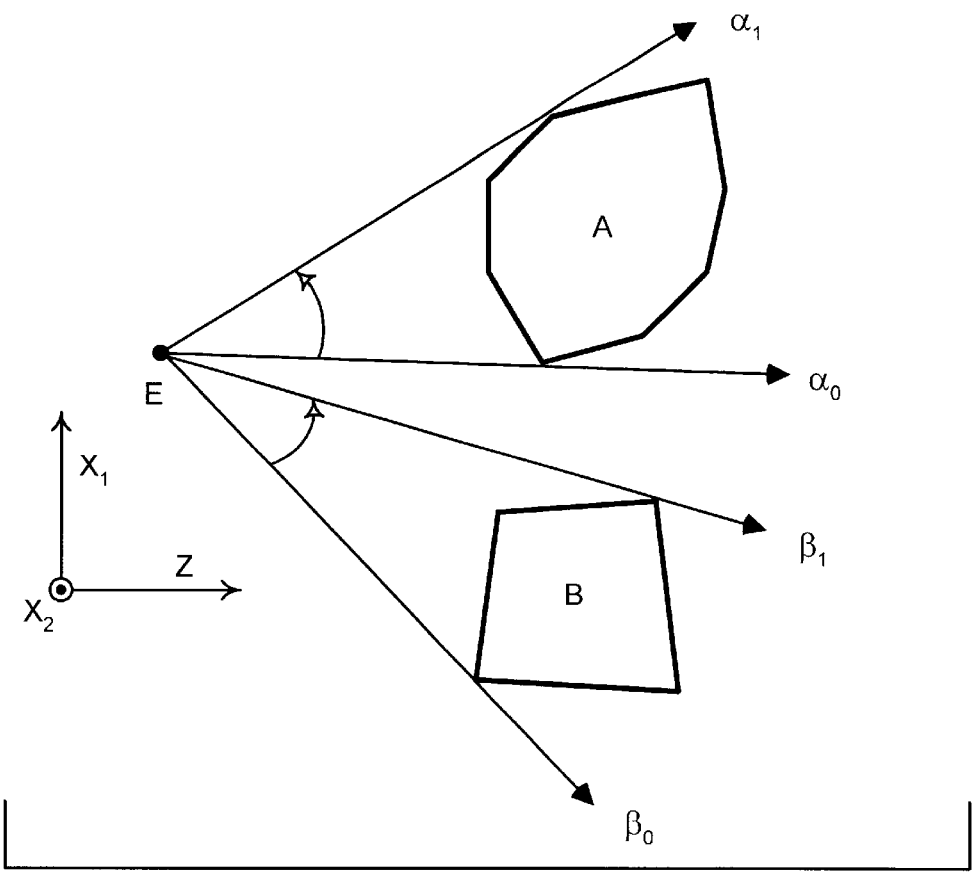
FIG. 8 is a diagram illustrating how angular extents can be used to determine whether the angular intervals of objects A and B intersect.
Figure 9:
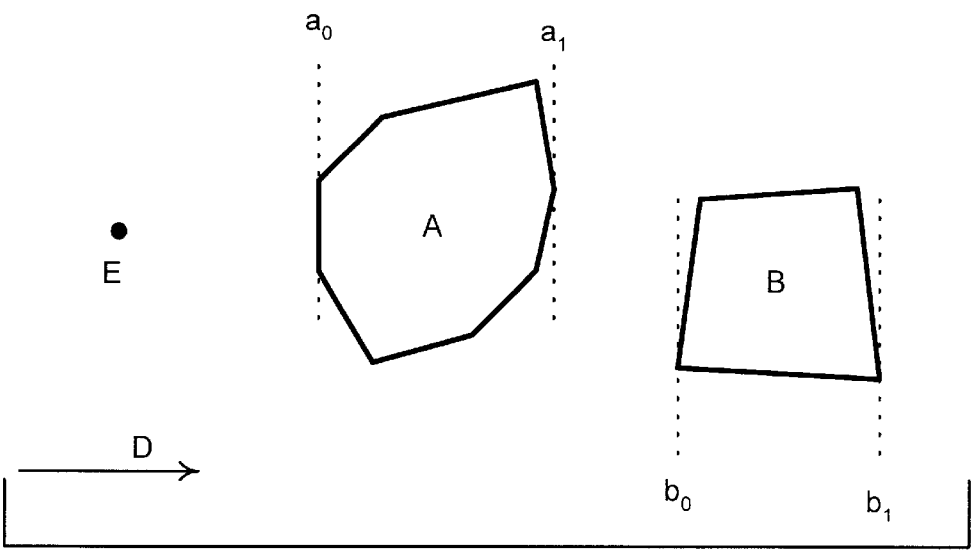
FIG. 9 is a diagram illustrating how spatial extents can be used to determine whether the spatial intervals of objects A and B intersect.

Given two objects, A and B, with interval (i.e., lower and upper) bounds for each of their extents, occlusion relationships can be tested with simple interval intersection tests performed independently for each extent, as shown in FIGS. 8 and 9. FIG. 8 illustrates how the angular extents are used to perform occlusion testing, and FIG. 9 illustrates how the spatial extents are used to perform occlusion testing.

Using FIG. 8 as an example, the occlusion test on angular extents can be expressed as:

$$[\alpha_0,\alpha_1] \cdot [\beta_0, \beta_1] = \emptyset \Rightarrow B \text{ does not occlude A}$$

Using FIG. 9 as an example, the occlusion test on spatial extents can be expressed as:

$$[a_0, a_1]\hat{}E \cdot D \cdot [b_0, b_1] = \emptyset \Rightarrow B \text{ does not occlude A}$$

To determine whether an object B does not occlude another object A, the occlusion detection method tests for empty interval intersection. For spatial extents, the test must enlarge A's interval with E·D to account for the intervening space between the eye and A. The ^ operator used in the above expression is defined as $[a,b]\hat{}c \equiv = [\min(a,c), \max(b,c)]$. The $n_s+n_a$ query extents with respect to A can be formed once, with the spatial extents computed by enlarging via $E \cdot D_i$, so that the problem of finding potential occluders of A reduces to finding all non-disjoint extents with respect to this query.

If any of the extent interval tests finds that B does not occlude A then the test can be concluded and B rejected as an occluder without testing more extents.

Figure 10A:
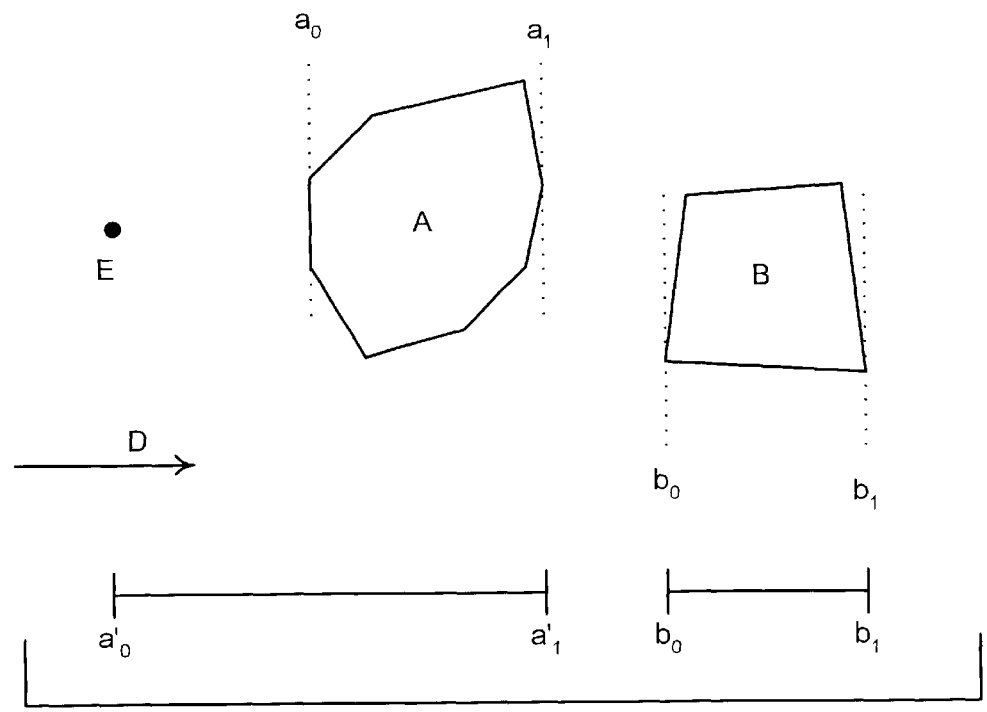
FIGS. 10A–C illustrate three cases of objects A and B in different positions relative to an eye point E to illustrate the occlusion test for spatial extents.
Figure 10B:
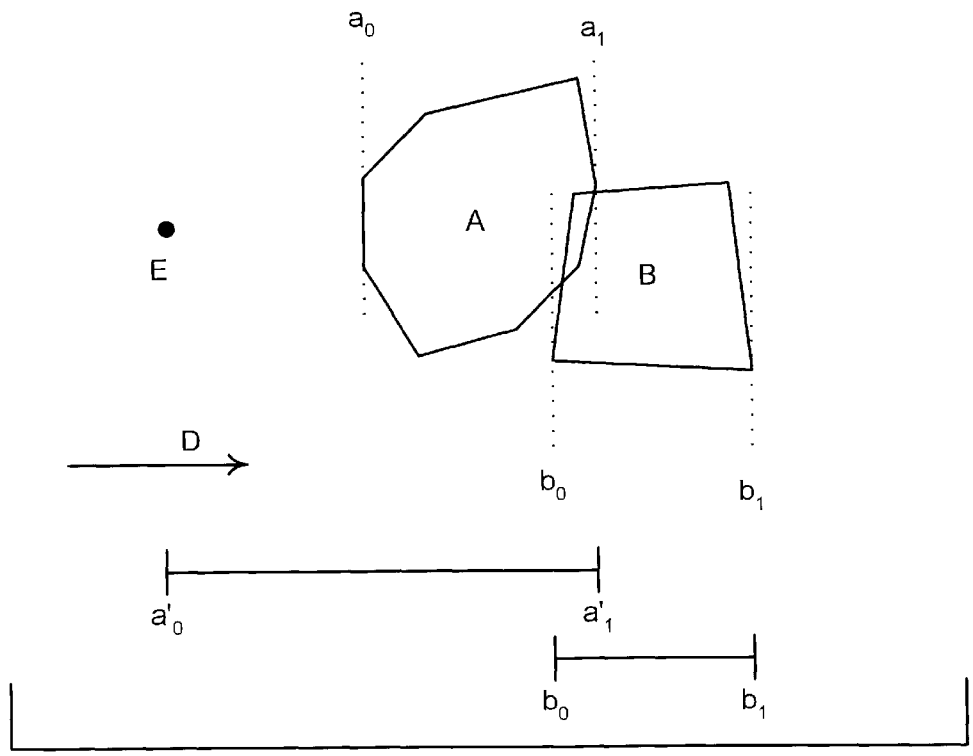
Figure 10C:
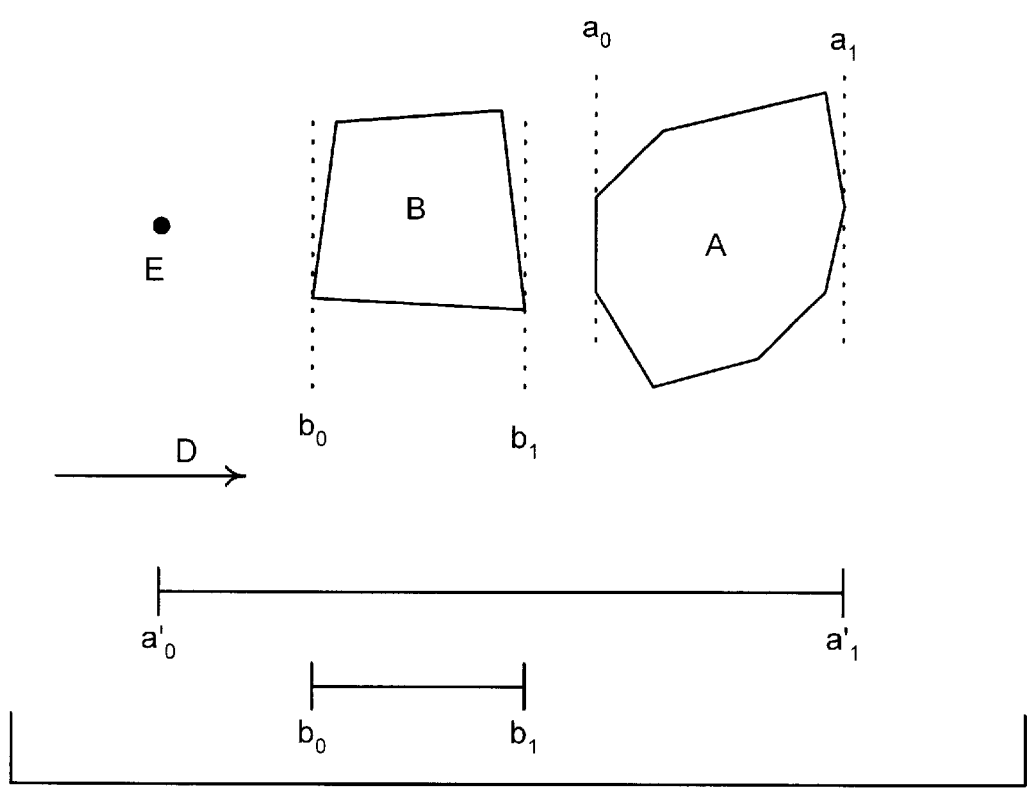

FIGS. 10A–C illustrate three cases in the occlusion test for spatial extents. FIG. 10A shows an example where B does not occlude A. FIGS. 10B and 10C show examples where B does potentially occlude A. To test whether B→A, A's spatial extent $[a_0,a_1]$ is expanded by E·D to yield $[a'_0,a'_1]$.

Three cases can occur in determining whether an object occludes other objects using spatial extents. In FIG. 10A, $[a'_0,a'_1]$ is disjoint from B's extent $[b_0,b_1]$, so B does not occlude A. In FIG. 10B, $[a'_0,a'_1]$ overlaps with $[b_0,b_1]$, so B→A is possible. In FIG. 10C, $[a'_0,a'_1]$ overlaps with $[b_0,b_1]$ even though A's extent $[a_0,a_1]$ is disjoint from B. Again, B→A is possible. Note that in FIGS. 10B and 10C, the spatial test must determine B→A for all $n_s$ spatial extents before the method concludes that B is a possible occluder of A. While a single extent suffices to demonstrate B does not occlude A, failure of this test for all extents leads to the conclusion that B is a possible occluder of A.

Spatial directions can be fixed in space or tied to a moving camera (e.g., depth). For unmoving objects, extents with respect to fixed directions are static, thus saving computation. Nevertheless, tying some spatial directions to the moving camera can be advantageous. For example, using a spatial direction tied to depth can avoid more expensive "branch cut rotation" computation discussed in the next section when objects are in front of the near clipping plane. Angular extents, while somewhat more expensive to compute than spatial extents, can be more effective in eliminating non-occluding candidates. The $n_a$ screen directions used for measuring angular extents are stored relative to the current camera as a set of 2D unit-length vectors $(x_i,y_i)$ which rotate about the Z axis to define the frame vectors $X_1$ and $X_2$. Likewise, any spatial directions tied to the camera are defined with a set of 3D unit-length vectors $(a_1,b_i,c_i)$ which define the spatial direction D via $$D \equiv a_i X_1 + b_i X_2 + c_i Z.$$

Tracking Extents

As objects and the camera move over time, the extents of the objects can change, and therefore, need to be updated. Preferably, the extents should be tracked coherently to minimize repeated computations every time the visibility sort is updated. For example, as a real time 3D graphics scene changes from frame to frame, the extents should be updated with minimal overhead.

Figure 11:
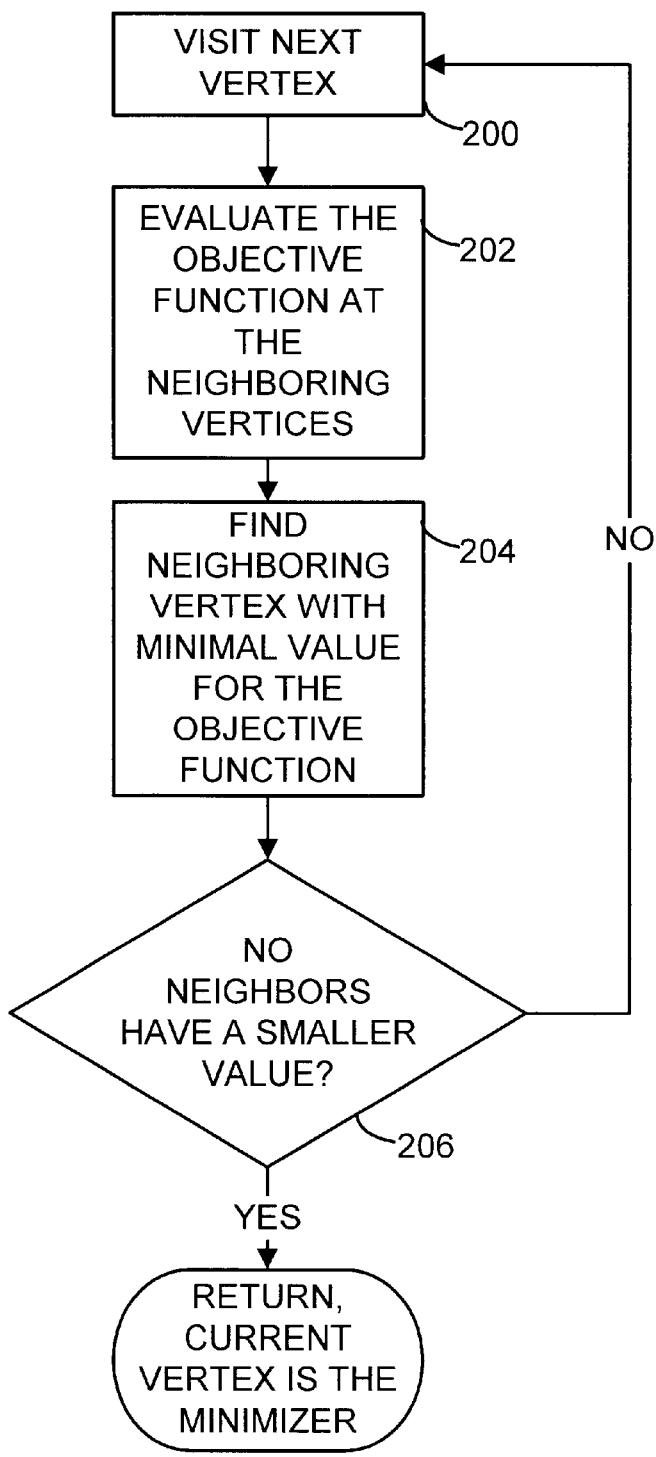
FIG. 11 is a flow diagram illustrating a routine for tracking extents on a convex hull corresponding to an object in a scene.

FIG. 11 is a flow diagram illustrating a method for evaluating the extents of convex polyhedra. Using the convex polyhedra, the method finds spatial and angular extents by "sliding downhill" (i.e., gradient descent) from vertex to neighboring vertex, and evaluating a measure of the extent (S(P) or A(P)) at each vertex.

FIG. 11 shows steps performed to search for the extents on the convex hull corresponding to an object. In the following description, the reference numbers in parentheses correspond to steps in FIG. 11. At each iteration, the neighboring vertex having the minimum value is accepted as the starting point for the next iteration (200). At each vertex selected as the next starting point, the method evaluates the objective function at the neighboring vertices (202), and finds the neighboring vertex with minimum value for the objective function currently being evaluated (204). If no neighbors have a minimum value less than the value at the current vertex (206), then the computation is halted with the current vertex returned as the minimizer. Otherwise, if a neighboring vertex has a smaller value, the method repeats the same evaluation with this neighboring vertex.

Small motions of the convex hull or the spatial/angular reference frame move the new extremal vertex at most a few neighbors away from the last one. By starting with the extremal vertex from the last query, the method for tracking extents exploits coherence in object and camera motions. Thus, the method exploits temporal coherence of scene changes by using extent data computed from the previous iteration as a starting point for the current iteration of the visibility sort. In this particular implementation, the extent data refers to the extremal vertex from the last iteration.

Spatial extent tracking evaluates S(P) at each vertex, involving a simple dot product. Angular extent tracking is somewhat more complicated. The following section discusses an optimization that eliminates the inverse tangent computation in A(P).

Optimizing the Angular Extent Objective Function

Figure 12:
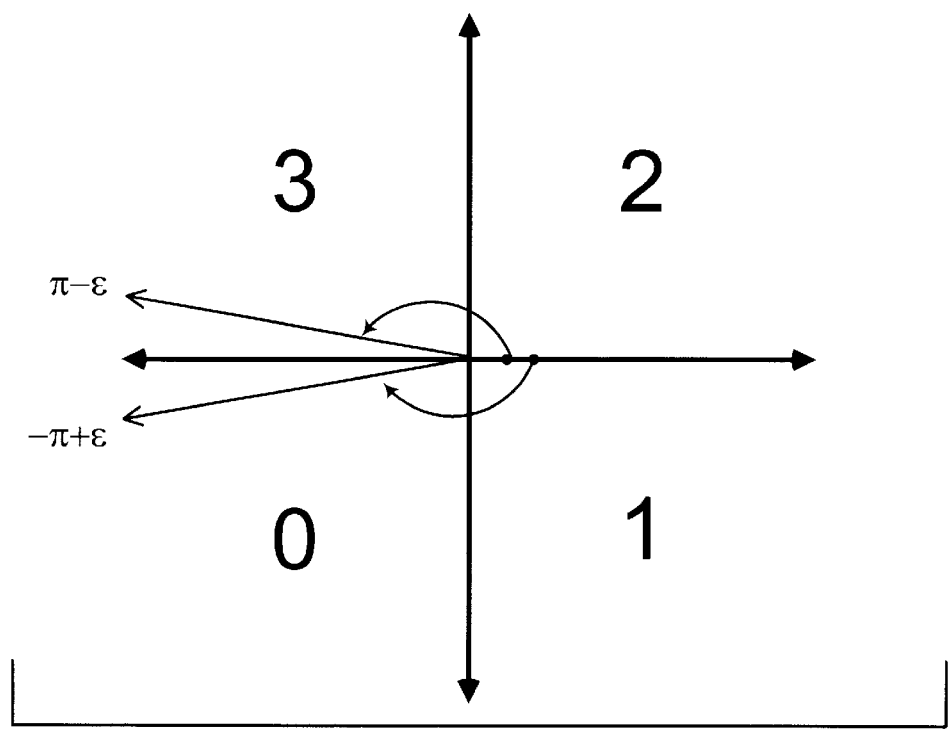
FIG. 12 is a diagram illustrating a labeling scheme used to track angular extents of objects.

The Angular Extent objective function measures angular extents using the inverse tangent function. The angular extent minimization procedure can avoid this evaluation by observing that it need only find whether a given angle is less than the current minimum, postponing a single inverse tangent evaluation until the global minimum is attained. To compute whether the angle formed by a given 2D vector (x,y) is less than the current minimum represented by (x',y'), the quadrant labeling scheme shown in FIG. 12 is used. Here, x represents the denominator in the argument of $\tan^{-1}$ of the angular extent objective function A (P) and y the numerator.

Clearly, if the new angle is in a different quadrant than the old minimum, then whether the angle is smaller or larger can be determined by whether the quadrant label is smaller or larger. Quadrant labels are computed by simple sign testing of x and y. If the angles are in the same quadrant, then the following test determines if the angle (x,y) is smaller: y'x>x'y.

That this formula is correct in quadrants 1 and 2 follows because the tangent function is monotonically increasing in $(-\pi/2, \pi/2)$, so $$y'x > x'y \Rightarrow y/x < y'/x' \Rightarrow \tan^{-1}(y/x) < \tan^{-1}(y'/x')$$

since x and x' are positive in quadrants 1 and 2. In quadrants 0 and 3, the test also holds, which can be seen by negating x (which is always negative in these Quadrants) and maximizing rather than minimizing the resulting reflected angle.

The Branch Cut Problem

Figure 13A:
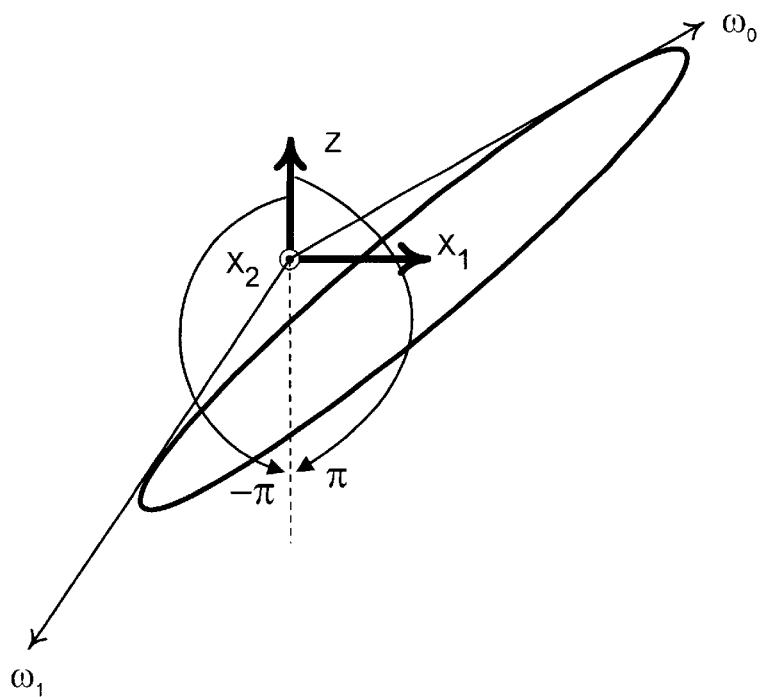
FIG. 13A illustrates the branch cut problem associated with angular extents of an object.
Figure 13B:
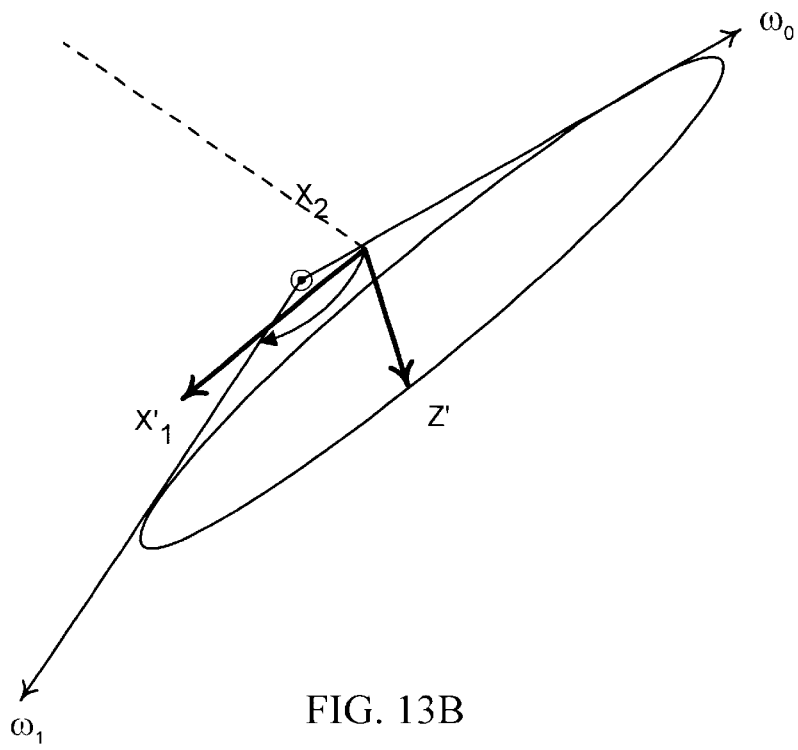
FIG. 13B illustrates that the branch cut problem can be solved by rotating the frame of reference of the object.

Angular extent tracking must also manage the branch cut problem, as shown in FIGS. 13A and 13B. FIG. 13A shows an example of an object with respect to a reference coordinate frame $(X_1, X_2, Z)$, where $X_2$ is out of the page. The "branch cut" is the direction where the angles $\pi$ and $-\pi$ are identical. In the canonical frame for angular extent measurement, Z corresponds to the line of sight and $X_1$ to the perpendicular direction to the right. The branch cut is thus the −Z direction. When an object straddles this branch cut, the coordinate frame must be rotated (about $X_2$) so that Z', the rotated version of Z, determines a plane whose normal in the Z' direction forms a separating plane between the eye point E and the object. The resulting angular extent can be converted to the canonical coordinate frame by adding an offset θ to the extent, where θ is the angle formed by Z' with Z in the canonical coordinate frame.

As shown in FIG. 13A, an object that straddles the branch cut (dashed line) has a "full" angular extent, $[-\pi,\pi]$, even though its visible extent is clearly smaller. By rotating the reference frame so that the branch cut is behind the object (Z maps to Z', $X_1$ to $X'_1$), the true angular extent can be found. In FIG. 13B, the reference frame is rotated such that the extent is $[\omega_0, \omega_1]$.

To determine a direction that guarantees that the branch cut falls behind an object, the method for tracking extents performs point inclusion tracking on the eye point E, which tests whether E falls inside or outside the hull, and if outside, returns a plane separating E from the object. The normal to this plane thus determines an appropriate (but not necessarily unique) Z'. If the eye is found to be inside the hull, the full angular range is returned. Proper branch cut rotation ensures that angular overlap is correctly tested for the visible region $[-\pi/2, \pi/2]$ with respect to the current camera. Angular overlaps can be missed outside of this region for objects that straddle the −Z branch cut, but such missed occlusions happen "behind the eye" (i.e., outside the visible region) and therefore do not invalidate the results. Despite these branch cut problems, angular extents usually yield useful occlusion information outside of the visible region, improving coherence of the visibility sort for head rotation motions.

The objects known to be in front of E with respect to the canonical direction need not be further tested using point inclusion testing or branch cut rotation. This makes the Z direction a good choice for one of the n, spatial extents, though as discussed previously such an extent is tied to the moving camera and thus must be updated even for unmoving objects.

Accelerating Occlusion Queries with Kd-Trees

The CVS method reduces the problem of finding all objects that occlude an object A to the following steps:
1) Forming a query extent for A, in which an $(n_a+n_s)$-dimensional interval is created by taking the angular extents without change and the spatial extents after enlarging by E·D, and
2) Finding all objects that overlap this query.

Hierarchically organizing object extents using a kd-tree accelerates finding the set of overlapping extents for a given query. A kd-tree is a binary tree which subdivides along k fixed dimensions. Each node T in the tree stores both the dimension subdivided (T.i) and the location of the partitioning point (T.v).

Figure 14:
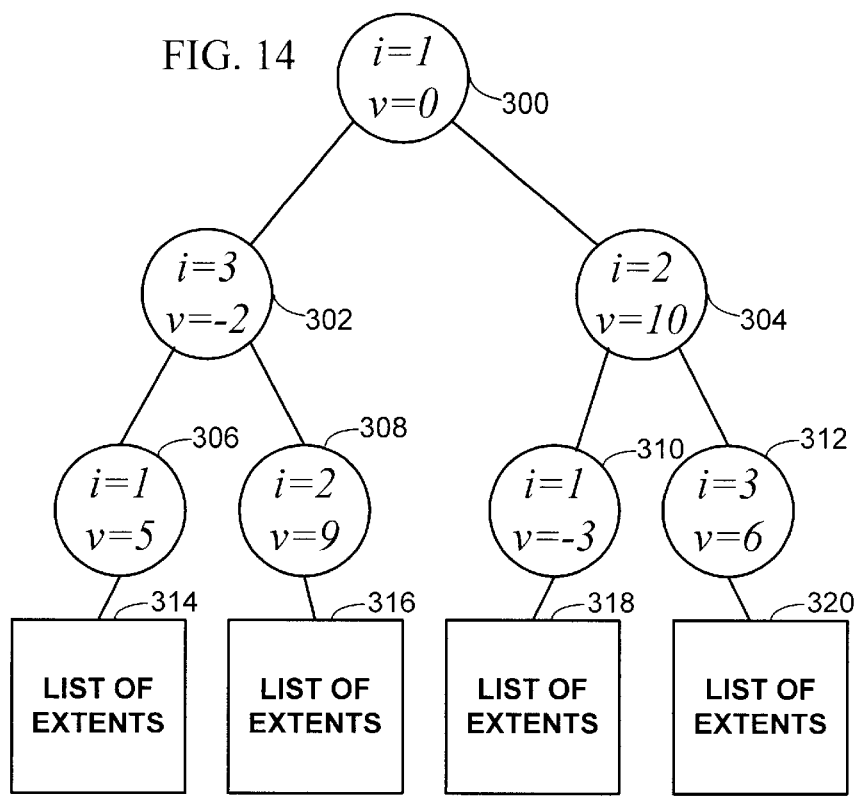
FIG. 14 illustrates an example of a kd-tree used to track extents and to perform fast occlusion detection coherently as objects in a scene change over time.

FIG. 14 illustrates an example of a kd-tree for three spatial dimensions. The circles 300–312 are nodes in the tree. In this example, each non-terminal node (i.e., node that is not a leaf on the tree) has a left and right child node (e.g., node 302 has left and right child nodes 306 and 308). The notation i refers to the dimension index and v to the location in the i-th dimension where space is partitioned. For example, at index 1 the dimension is partitioned into $x_1 < 0$ and $x_1 \geq 0$. The terminal nodes (306–312) include a reference to a list of extents for objects that overlap the portion of space represented by the node (314–320).

In the CVS method, the number of dimensions of the tree is $k=n_a+n_s$. Object extents whose T.i-th dimension interval lower bound is less than T.v are placed in the left child of node T; those whose upper bound is greater than T.v are placed in the right child. In particular, this implies that objects whose T.i-th interval contains T.v exist in both subtrees.

A simple minimum cost metric is used to determine a subdivision point for a list of intervals, representing the 1D extents for the set of objects for one of the $n_a$ angular or $n_s$ spatial directions. This cost sums measures of "unbalancedness", or how unequal the number of intervals from the right and left subtrees, and "redundancy", or how many intervals were placed on both sides. Avoiding lopsided trees and trees in which many objects are repeated in both subtrees is desirable since such trees tend to degrade query performance in the average case.

Figure 15:
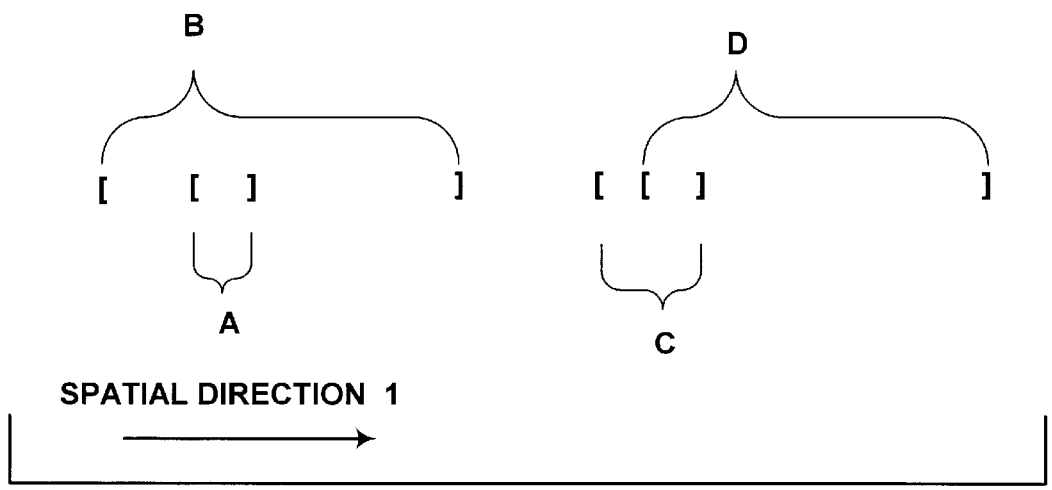
FIG. 15 illustrates an example of a 1 dimensional sorted bound list used in fast occlusion detection.

To compute the cost, the lower and upper sides of all intervals are placed in a sorted list $\{s_1\}$ having 2n entries, called a 1D sorted bound list (recall that n is the number of aggregate objects to be visibility sorted.). Consider the example of the extents along one spatial dimension for objects A, B, C, and D as shown in FIG. 15. The spatial dimension is in the direction shown by the arrow in FIG. 15. The square brackets represent the upper and lower bounds of the respective objects: left bracket=lower bound; and right bracket=upper bound. The 1D sorted bound list for this example is $B_{lower}$, $A_{lower}$, $A_{upper}$, $B_{upper}$, $C_{lower}$, $D_{lower}$, $C_{upper}$, $D_{upper}$.

In the following algorithm for computing cost, the notation $s_i.v$ denotes the lower or upper bound location of the i-th element of the ID sorted bound list, and $s_i.b$ indicates whether the bound is lower ($s_i.b$=LOWER) or upper ($s_i.b$=UPPER). MinCost computes the minimum cost with a single traversal of $\{s_i\}$. It assumes that all intervals in the sorted list have nonzero width, and that upper bounds come before lower bounds in the ordering whenever they are equal.

MinCost ($s_i$) [computes cost of optimal partitioning of Id sorted bound list]$C \leftarrow \infty$
$n_l \leftarrow 0, n_r \leftarrow 0$
for i=1 to 2n
    if $s_i.b$=UPPER then $n_r \leftarrow n_r+1$
    $c_j \leftarrow |n_l-(n-n_r)|/2+n_l-n_r$
    $C \leftarrow \min(C,c_i)$
    if $s_i.b$=LOWER then $n_l \leftarrow n_l+1$
endfor
return C Partitioning always occurs immediately after a lower bound or before an upper bound. Intervals are assumed to be open. This is the reason for the increment of $n_r$ before and $n_l$ after the cost evaluation. The parameters $n_l$ and $n_r$ represent the number of lower and upper bounds traversed so far, $c_i$ measures the cost of splitting at $s_i.v$ and is formed from two terms where $|n_l-(n-n_r)|/2$ represents the unbalancedness, and $n_l-n_r$ the redundancy.

Constructing the kd-Tree

Figure 16:
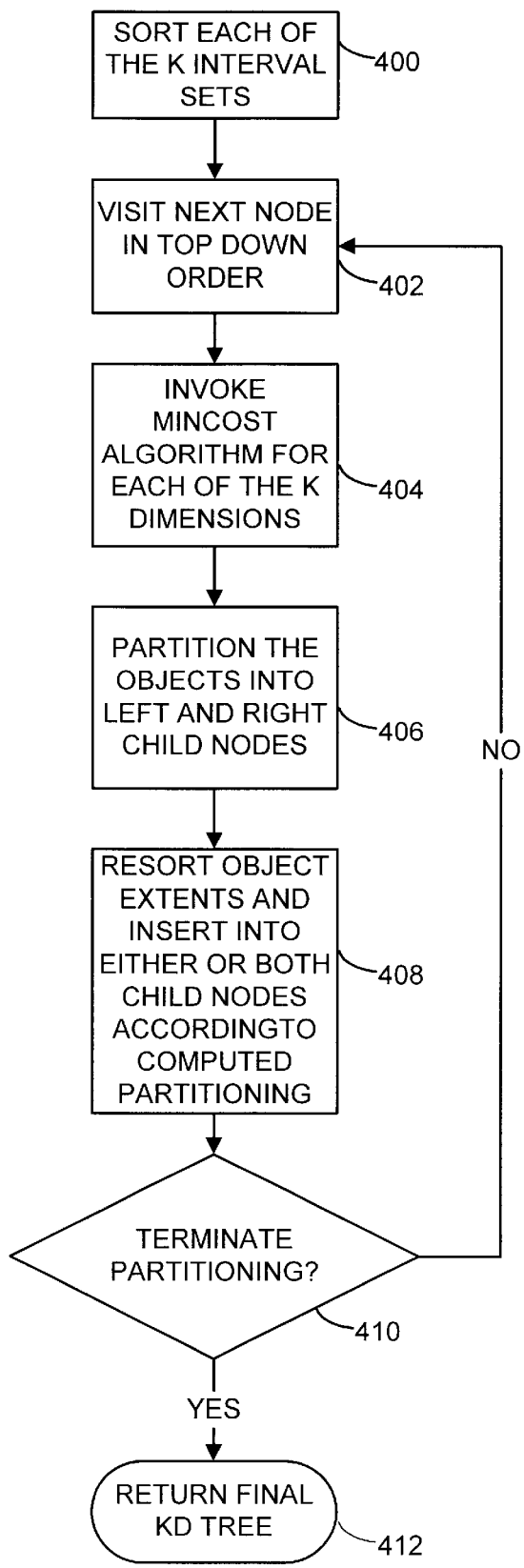
FIG. 16 is a flow diagram illustrating a routine for building a kd-tree used to perform fast occlusion detection.

FIG. 16 illustrates a flow diagram illustrating how the CVS method builds a kd-tree. To build the kd-tree, the method begins by sorting each of the $k=n_s+n_a$ interval sets to produce ID sorted bound lists (400). The kd-tree is then built recursively in a top-down fashion. FIG. 16 illustrates the recursive feature of the method as a repeating loop through steps 402–410 until all nodes are visited. To subdivide a node, the MinCost algorithm is invoked for each of the k dimensions (404), and the dimension of lowest cost used to partition (406). Object extents for the left and right subtrees can then be re-sorted to produce valid 1D sorted bound lists using a single traversal of the original list, by inserting to either or both child lists according to the computed partitioning (408). The method for building the tree then repeats the same procedure at the left and right sides of the kd-tree (loop back to step 402 for left and right child nodes).

After creating new child nodes, the method determines whether to terminate the partitioning of space (410). The process of building the tree terminates when the number of objects in a given node is sufficiently small, or when the partitioning produces at least one list that is no smaller than its parent. When it reaches this point, the method stops the recursion, using the unchanged list as the terminal kd node (412). A terminal node T stores the 1D sorted bound list only for dimension T.i, which is used to update the subdivision value T.v in future queries, and to shift objects between left and right subtrees as they move.

Updating the Kd-Tree as Extents Change

Figure 17:
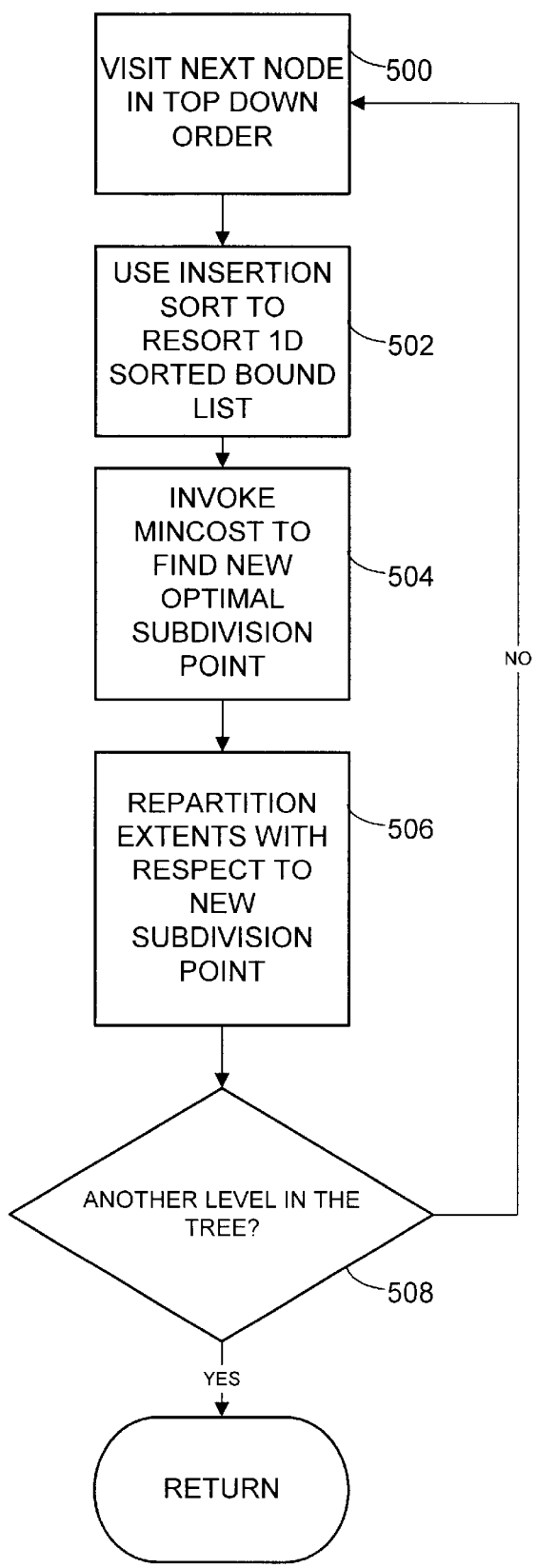
FIG. 17 is a flow diagram illustrating a routine for maintaining a kd-tree as objects change over time.

FIG. 17 illustrates a method for maintaining a kd-tree as the extents of the objects change due to movement of the objects and camera position. To maintain the kd-tree as object extents change, the routine for updating the tree visits all of the tree's nodes depth-first (500). At each node T, the 1D sorted bound list is resorted using an insertion sort (502), and the MinCost algorithm is invoked to find a new optimal subdivision point, T.v (504). Extents are then repartitioned with respect to the new T.v (506), shifting extents between left and right subtrees. The method then proceeds to the next level in the tree (508).

Extent addition is done lazily (i.e., only to the immediate child), with further insertion occurring when the child nodes are visited. Extent deletion is done imniediately for all subtrees in which the extent appears, an operation that can be done efficiently by recording a (possibly null) left and right child pointer for each extent stored in T. Note that coherent changes to the object extents yield an essentially linear resort of bound lists, and few objects that must be shifted between subtrees. A further optimization is to note that when no bound is moved in the bound list resort at T, there is no need for further processing in T, including the MinCost invocation or repartitioning. However, the child nodes of T must still be traversed in case their ordering needs to be updated.

It is important to realize that the coherence of kd-tree maintenance depends on fixing the subdivision dimension T.i at each node. If changes in the subdivided dimension were allowed, large numbers of extents could be shifted between left and right subtrees, eliminating coherence in all descendants. Fixing T.i but not T.v restores coherence, but since T.i is computed only once, the tree can gradually become less efficient for query acceleration as object extents change. This problem can be dealt with in the application by choosing when to rebuild the tree and when to maintain it by measuring historical query performance or intrinsic indicators of tree effectiveness (e.g., tree balance), and by gradually rebuilding a new kd-tree as a background process while simultaneously maintaining an older version.

Querying the kd-Tree to Determine Occlusion

Figure 18:
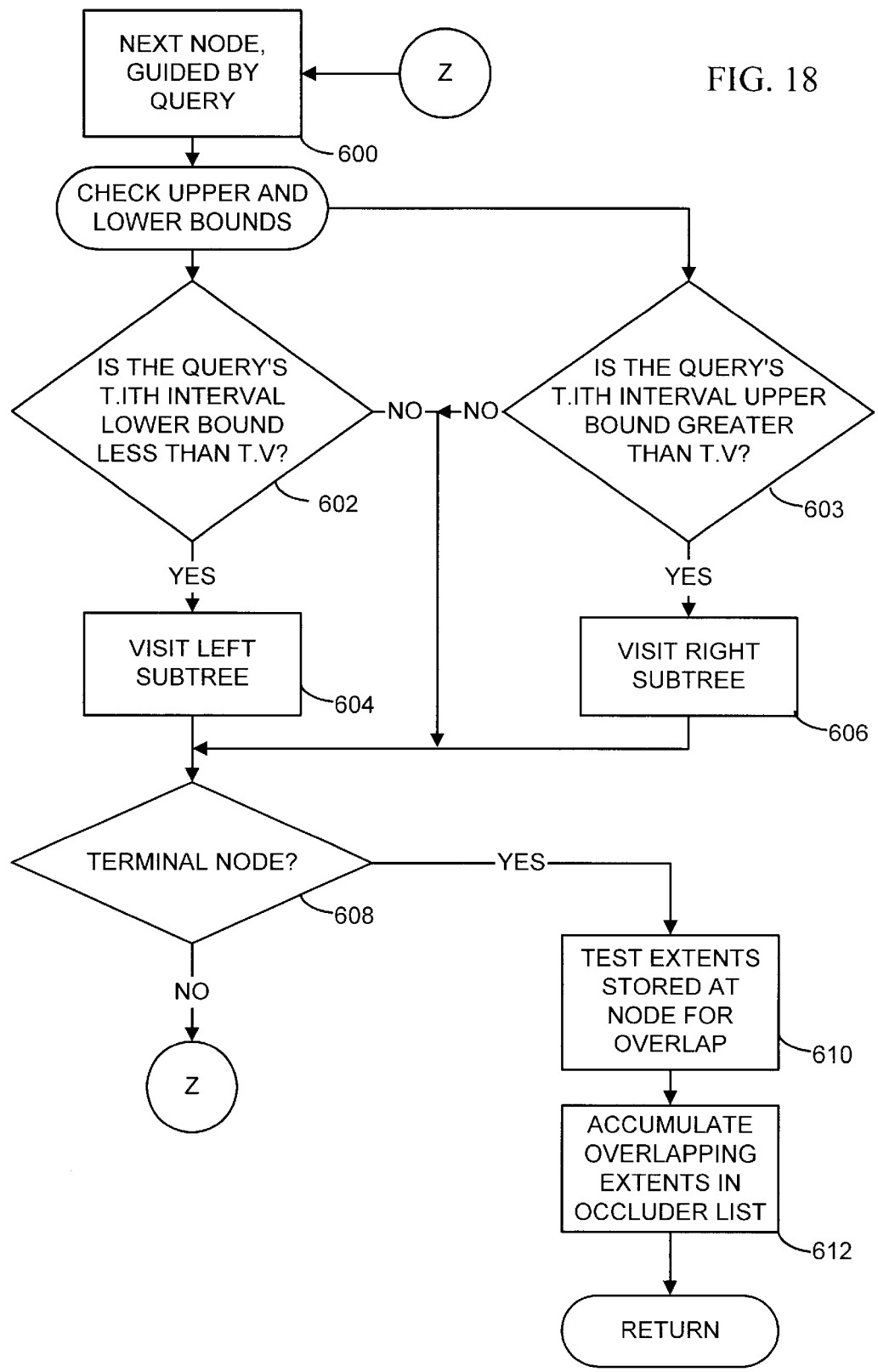
FIG. 18 is a flow diagram illustrating a routine for querying a kd-tree to perform fast occlusion detection.

Querying the kd-tree involves simple descent guided by the query. FIG. 18 is a flow diagram illustrating a method for querying the kd-tree. The query begins at the root of the tree and descends the tree based on a comparison of the extents of an object being evaluated and the partition location of the node T.v (600). At a given node T, if the query's T.i-th interval lower bound is less than T.v (602), then the left subtree is recursively visited (604). Similarly, if the query's T.i-th interval upper bound is greater than T.v then the right subtree is recursively visited (606). When a terminal node is reached (608), all extents stored there are fully tested for overlap with respect to all k dimensions (610). Overlapping extents are accumulated by inserting into an occluder list (612). An extent is inserted only once in the occluder list, though it may occur in multiple leaf nodes of the kd-tree.

An additional concern is that the occlusion query should return occluders of an object A that have not already been inserted into the output list. Restricting the set of occluders to the set remaining in L can be accomplished by activating/deactivating extents in the kd-tree. The current implementation simply flags deactivated objects at the leaf nodes of the kd tree so that they are returned as occluders; the tree structure is not changed as objects are deactivated. Counts of active objects within each kd-tree node are kept so that nodes in which all objects have been deactivated can be ignored, at any level in the tree. To increase efficiency, additional data structures can be used to exploit deactivation.

When A is popped off the list L in the CVS method, all objects grouped within it are deactivated. Deactivated objects are handled by attaching a flag to each object in the list stored at each terminal node of the kd-tree.

Deactivating an object involves following its left and right subtree pointers, beginning at the kd root, to arrive at terminal lists containing the object to be deactivated. Activation is done similarly, with the flag set to a different value indicating an activated object. Objects are activated in the CVS method when it is determined that they must be reinserted in the list L, rather than appended to the output order, because of the existence of occluders.

Occlusion Cycle Growth with Grouped Objects

Figure 19:
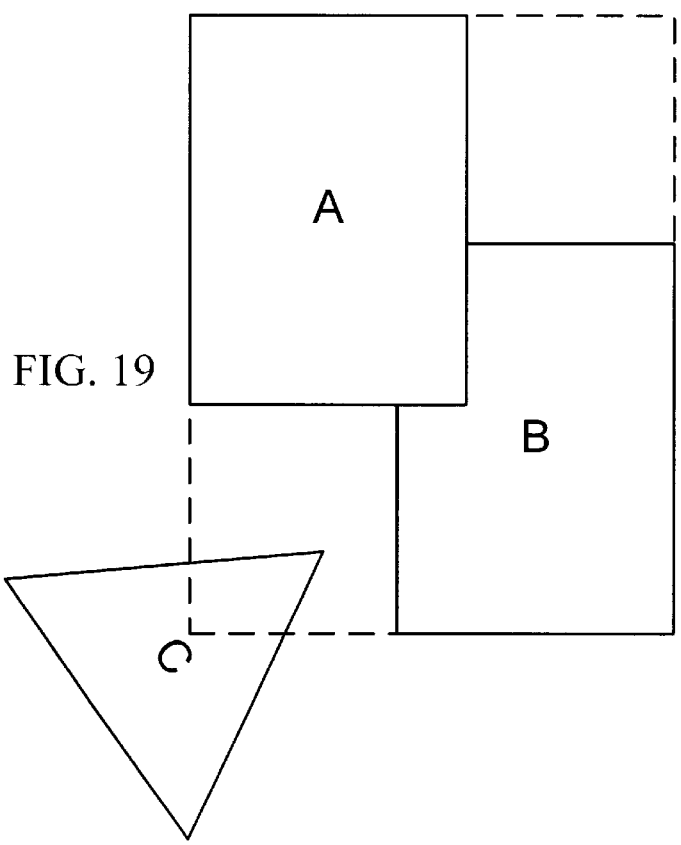
FIG. 19 is a diagram illustrating a potential problem of occlusion growth when conservative bounds are used on objects to perform fast occlusion detection.

The occlusion testing described so far is conservative, in the sense that possible occluders of an object can be returned which do not in fact occlude it. There are two sources of this conservatism. First, occlusion is tested with respect to a fixed set of spatial and/or angular extents, which essentially creates an object larger than the original convex hull and thus more likely to be occluded. Second, extents for grouped objects are computed by taking the union of the extents of the members, even though the unioned bound may contain much empty space, as shown in FIG. 19. The next section will show how to compute an exact occlusion test between a pair of convex objects, thus handling the first problem. This section describes a more stringent test for grouped objects which removes the second problem.

Occlusion testing that is too conservative can lead to very large groupings of objects in occlusion cycles. In the extreme case every object is inserted into a single SCC. This is especially problematic because of the second source of conservatism—that bounds essentially grow to encompass all members of the current SCC, which in turn occlude further objects, and so on, until the SCC becomes very large.

To handle this problem, the CVS method uses additional tests when a grouped object A is tested for occlusion. A's unioned extents are used to return a candidate list of possible occluders, as usual. Then the list of occluders is scanned to make sure each occludes at least one of the primitive members of A, using a simple k-dimensional interval intersection test. Any elements of the list that do not occlude at least one member of A are rejected, thus ensuring that "holes" within the grouped object can be "seen through" without causing occlusions. Finally, remaining objects can be tested against primitive members of A using the exact occlusion test.

FIG. 19 illustrates an example of how the extents of a grouped object can grow to such an extent that the occlusion test incorrectly indicates an occluder. In this example, objects A and B have been grouped because they are mutually occluding. A simple bound around their union, shown by the dashed lines, occludes object C, even though the objects themselves do not. To address this problem, the CVS method uses the bounded extents around grouped objects for a quick cull of non-occluders, but tests objects which are not so culled further to make sure they occlude at least one primitive element of a grouped object.

Exact Occlusion Detection

The routines described above provide a fast but conservative pruning of the set of objects that can possibly occlude a given object A. To produce the set of objects that actually occlude A with respect to the convex hull bounds, the CVS method applies an exact test of occlusion for primitive object pairs (A,B), which determines whether B→A.

The test is used in the CVS method by scanning the list of primitive elements of the possibly grouped object A and ensuring that at least one occluder in the returned list occludes it, with respect to the exact test. The exact test is thus used as a last resort when the fast methods fail to reject occluders.

Figure 20:
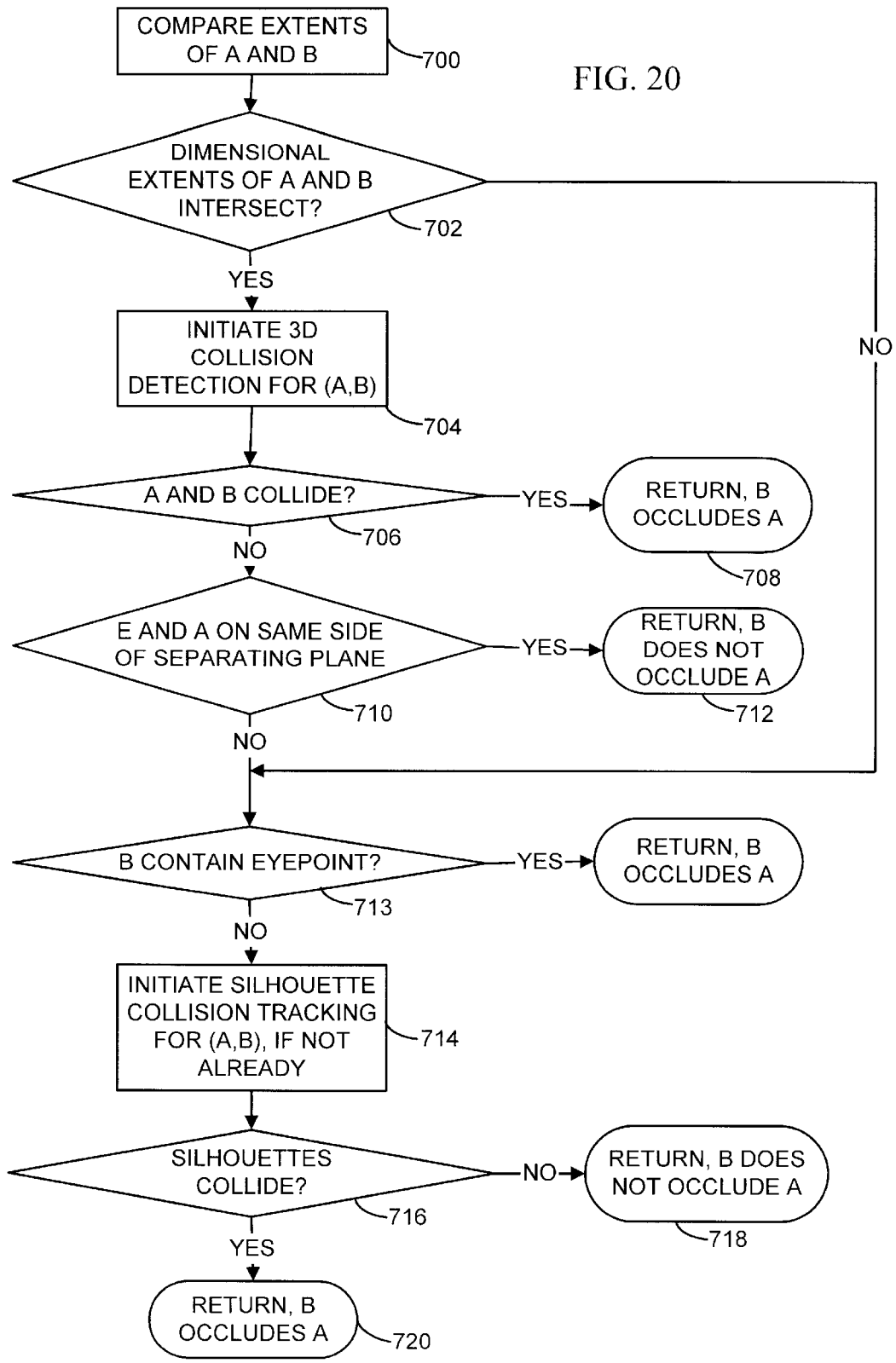
FIG. 20 is a flow diagram illustrating a method for performing exact occlusion detection of convex objects in a scene.

The exact occlusion test algorithm is as follows below. The steps of this method are also illustrated in FIG. 20.
ExactOcclusion (A, B) [returns whether B→A]
if $n_s$=0 or $n_s$-dimensional extents of A and B intersect (700, 702)
    initiate 3D collision tracking for (A,B), if not already (704)
    if A and B collide (706), return B→A (708)
    if E on same side of separating plane as A (710), return B does not occlude A (712)
endif
∃[invariant: ∃ separating plane between A and B with B on eye side, implying A does not occlude B]
if B contains eye point, return B→A (713)
initiate silhouette collision tracking for (A,B), if not already (714)
if silhouettes collide (716), return B→A (720)
else return B does not occlude A (718)

To see that this approach correctly detects whether an object A occludes another object B, consider the case in which the spatial extents of A and B intersect as shown in FIG. 10B. If the objects collide with respect to an exact 3D test then B→A (A→B as well). If the objects do not collide, then the collision procedure supplies a separating plane for the two objects. If the eye point E is on the same side of this plane as A, then clearly B does not occlude A. Otherwise, B is on the eye side of the separating plane, as is claimed in the invariant. Next, consider the case in which the two objects do not intersect with respect to their spatial extents.

Again, B must be on the eye side of a separating plane since otherwise the fast test would have rejected B as an occluder of A. This is so because for B to be considered a potential occluder of A, the spatial extents of A expanded by the eye point E must overlap in all $n_s$ spatial extents. But since (the unexpanded) A is disjoint from B with respect to these $n_s$ spatial extents, B must be on the eye side of at least one of the extent directions which forms a separating plane between A and B (see FIG. 10C). This shows the correctness of the invariant.

Next, the exact test checks for silhouette collision between A and B, unless B contains E, in which case B occludes everything including A. Note that A cannot contain the eye point since the invariant shows A must be separated from (on the non-eye side of) the eye point. Therefore both A and B have valid silhouettes.

Clearly, if the silhouettes do not collide then B does not occlude A (A does not occlude B as well). If they do, then A→B or B→A. But, the test has previously shown that A does not occlude B, therefore B→A.

The CVS method is extended to make use of a hash table of object pairs for which 3D collision tracking and/or silhouette collision tracking have been initialized, allowing fast access to the information. Tracking is discontinued for a pair if the information is not accessed in the CVS method after more than a parameterized number of invocations. The next sections further discuss coherent methods for 3D collision detection and silhouette collision detection on convex polyhedra.

Note that further occlusion resolution is also possible with respect to the actual objects rather than convex bounds around them. It is also possible to inject special knowledge in the occlusion resolution process, such as the fact that a given separating plane is known to exist between certain pairs of objects, like joints in an articulated character.

3D Collision Tracking

To coherently detect collisions between moving 3D convex polyhedra, the CVS method uses a modification of a collision detection routine described in two papers: Chung, Kelvin, and Wenping Wang, "Quick Collision Detection of Polytopes in Virtual Environments," ACM Symposium on Virtual Reality Software and Technology 1996, July 1996, pp. 1–4 [Chung96a]; and Chung, Tat Leung (Kelvin), "An Efficient Collision Detection Algorithm for Polytopes in Virtual Environments," M. Phil Thesis at the University of Hong Kong, 1996 [www.cs.hku.hk/~tlchung/collision\_library.html] [Chung96b].

Chung's routine iterates over a potential separating plane direction between the two objects. Given a direction, it is easy to find the extremal vertices with respect to that direction as already discussed above in the section on tracking extents. If the current direction D points outward from the first object A, and the respective extremal vertices with respect to D is $v_A$ on object A and with respect to $-D$ is $v_B$ on object B, then D is a separating direction if $$D \cdot v_A < D \cdot v_B.$$

Here, $v_A$ maximizes the dot product with respect to D over object A and $v_B$ minimizes the dot product over object B. For the moment, assume that vertices on the objects and vectors exist in a common coordinate system.

If D fails to separate the objects, then it is updated by reflecting with respect to the line joining the two extremal points. Mathematically, $$D' \equiv D - 2(R \cdot D)R$$

where R is the unit vector in the direction $v_B - v_A$. Chung96b proves that if the objects are indeed disjoint, then this routine converges to a separating direction for the objects A and B.

To detect the case of object collision, Chung's routine keeps track of the directions from $v_A$ to $v_B$ generated at each iteration and detects when these vectors span greater than a hemispherical set of directions in $S^2$. This approach works well in the 3D simulation domain where collision responses are generated that tend to keep objects from interpenetrating, making collisions relatively evanescent. In the visibility sorting domain however, there is no guarantee that a collision between the convex hulls of some object pairs will not persist in time. For example, a terrain cell object may have a convex hull that encompasses several object that lie above it for many frames. In this case, Chung's routine is quite inefficient but can be modified to coherently track colliding pairs as discussed in the next section. While it is well known that collisions between linearly transforming and translating convex polyhedra can be detected with efficient, coherent algorithms, Chung's routine has several advantages over previous methods, notably the Voronoi feature tracking algorithm and Gilbert's algorithm discussed below.

The inner loop of Chung's routine finds the extremal vertex with respect to a current direction, a very fast approach for convex polyhedra. Also, the direction can be transformed to the local space of each convex hull once and then used in the vertex gradient descent routine. Chung found a substantial speedup factor in experiments comparing his approach with its fastest competitors. Furthermore, Chung found that most queries were resolved with only a few iterations (<4) of the separating direction.

Figure 21A:
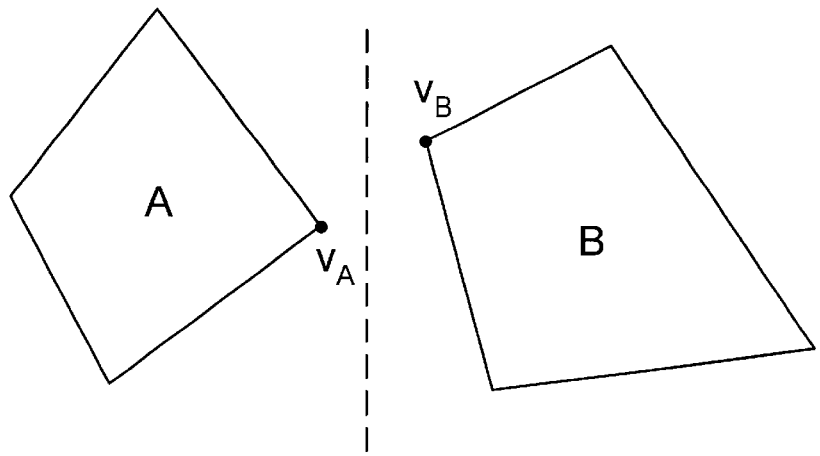
FIGS. 21A–C illustrate three cases of objects A and B and their corresponding extremal vertices $v_A$ and $v_B$ to illustrate the need to track persistent intersection of the objects in a coherent method for detecting object collisions.
Figure 21B:
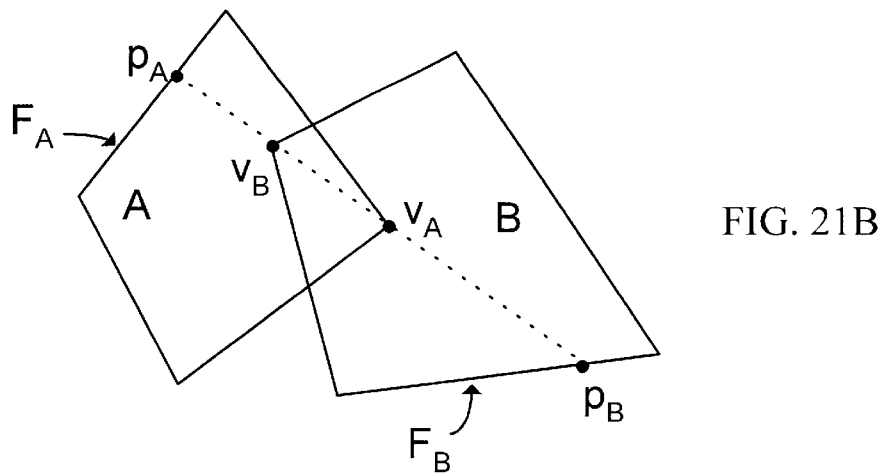
Figure 21C:
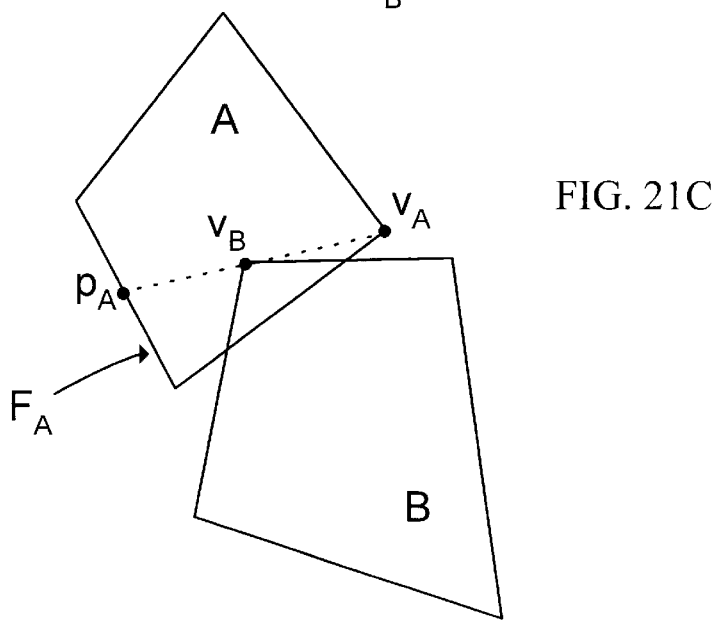

FIGS. 21A–21C illustrate examples of two objects A and B to show the limitations of Chung's collision detection routine in coherently detecting cases where collisions between objects persist over time (e.g., for more than one frame in animation sequence). In the example shown in FIG. 21 A, Chung's routine for collision detection works coherently. Here, two convex objects are non-intersecting. Chung's routine iterates over vertex pairs ($v_A, v_B$) which are extremal with respect to a direction until the direction is found to be separating plane. After A and B are moved slightly, the routine can verify that they do not intersect with a small amount of computation.

If however A and B do intersect (as shown in examples FIGS. 21B and 21C), a modification to Chung's routine is required to verify that the intersection persists without undue computation. The exact collision detection approach used in the CVS method iterates over vertex pairs like Chung, but keeps track of the intersection of the line between $v_A$ and $v_B$ and the outside of each of the respective convex polyhedra. In FIG. 21B, this line (dotted) intersects the boundary of A at face $F_A$ and point $p_A$, and the boundary of B at face $F_B$ and point $p_B$. Since the segment from $v_A$ to $v_B$ is inside both polyhedra, they intersect. This condition can be verified with only a simple computation as A and B are moved slightly.

Similarly, in FIG. 21 C, the line from $v_A$ to $v_B$ intersects the boundary of A at face $F_A$ and point $p_A$ but is outside the boundary of B. Still, the point $v_B$ is inside both polyhedra, a fact that can again be verified coherently as explained below.

Tracking Persistent Intersection of Objects

The exact collision detection routine used in the CVS method tracks persistent intersection of objects, i.e., objects that intersect for more than one frame. To achieve this, it uses a modification to Chung's routine that tracks not only the extremal vertices with respect to the potential separating direction but also the faces in either object that intersect the segment joining the extremal vertices, $v_A$ and $v_B$, called "opposite faces". The opposite face can be used to find the part of the joining segment lying entirely within the hulls of the respective objects, $J_A$ and $J_B$, called "interior joining segments".

In this section, points and vectors are assumed to exist in the coordinate system of the object designated by the subscript; e.g., $v_A$ is the extremal point in the local coordinate system of A. Primed points or vectors are assumed to be transformed to the other coordinate system; e.g., $v'_B$ is the extremal vertex on B transformed to A's coordinate system.

Figure 22:
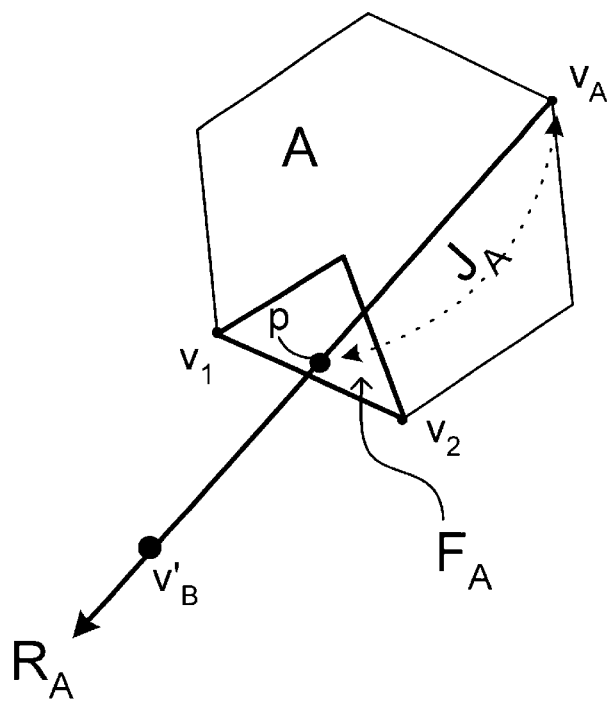
FIG. 22 is a diagram of an object A to illustrate how a collision detection routine tracks "opposite faces" $F_A$ of objects in a scene.

FIG. 22 shows an example of an object A illustrating an opposite face $F_A$ and the interior joining segment, $J_A$. $F_A$ is the face intersected by the ray $R_A$ from $v_A$ to $v'_B$ at point p. The vertices $v_1$ and $v_2$ on A form an edge on $F_A$. Note that the segment $J_A$ and the opposite face $F_A$ only exist if the direction to the extremal point on object B, $v'_B$, is "locally inside" A, as shown in FIG. 23A, and similarly for segment $J_B$ and face $F_B$.

Figures 23A, 23B:
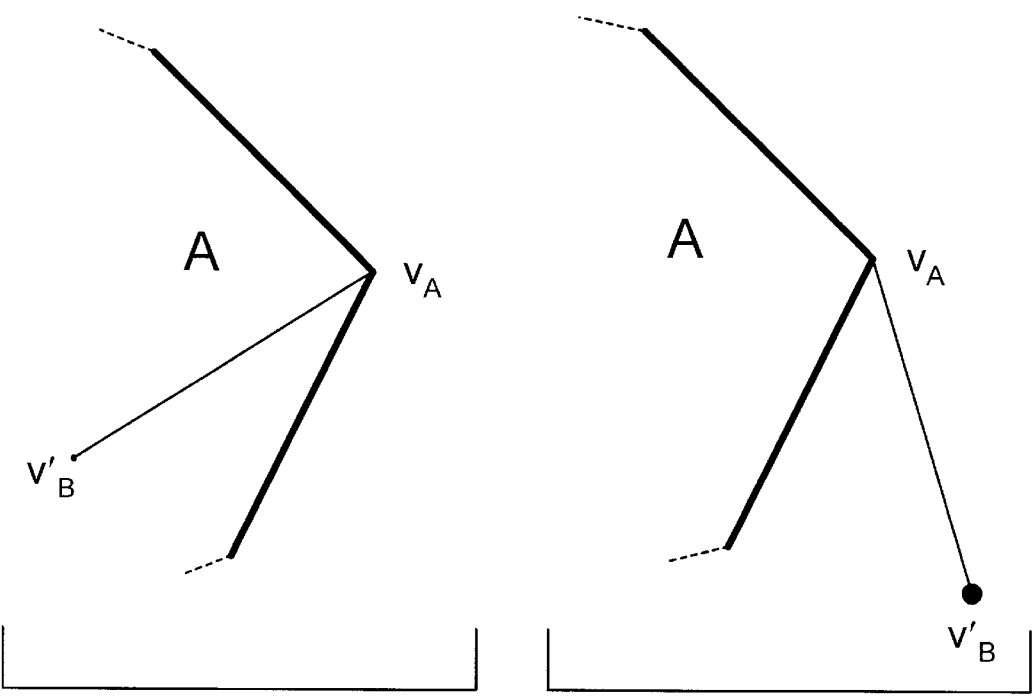
FIGS. 23A and 23B are diagrams illustrating an object A and a segment joining extremal vertices of object A and object B ($v_A$ and $v_B$) to illustrate how the collision detection routine tracks persistent intersection of objects.

FIGS. 23A and 23B show a portion of an object A, its extremal vertex $v_A$ and the extremal vertex $v'_B$ of another object (object B). FIG. 23A illustrates a case where the joining segment between the extremal vertices is locally inside object A, while FIG. 23B illustrates a case where the joining segment is locally outside. This is because the extremal vertex of object B, $v'_B$, is locally inside the convex corner of A at $v_A$ in FIG. 23A and locally outside in FIG. 23B. The test for local insideness can be computed by testing the point $v'_B$ against the plane equations of all faces emanating from $v_A$. If $v'_B$ is inside with respect to all such planes, it is locally inside; otherwise, it is locally outside.

If the joining segments of objects A and B, $J_A$ and $J_B$, both exist and intersect, then the convex hulls also intersect. Furthermore, if $J_A$ exists, and $v'_B$ is on this segment, then the convex hulls intersect. Similarly, if $J_B$ exists and $v'_A$ is on this segment, then the hulls intersect.

In order to detect persistent intersections of objects coherently, the collision detection routine tracks the "opposite faces" of objects from frame to frame. First, the collision detection routine determines the starting face, if it has not selected one already. Then, starting at this face, it proceeds to find the opposite face.

Figures 24, 25:
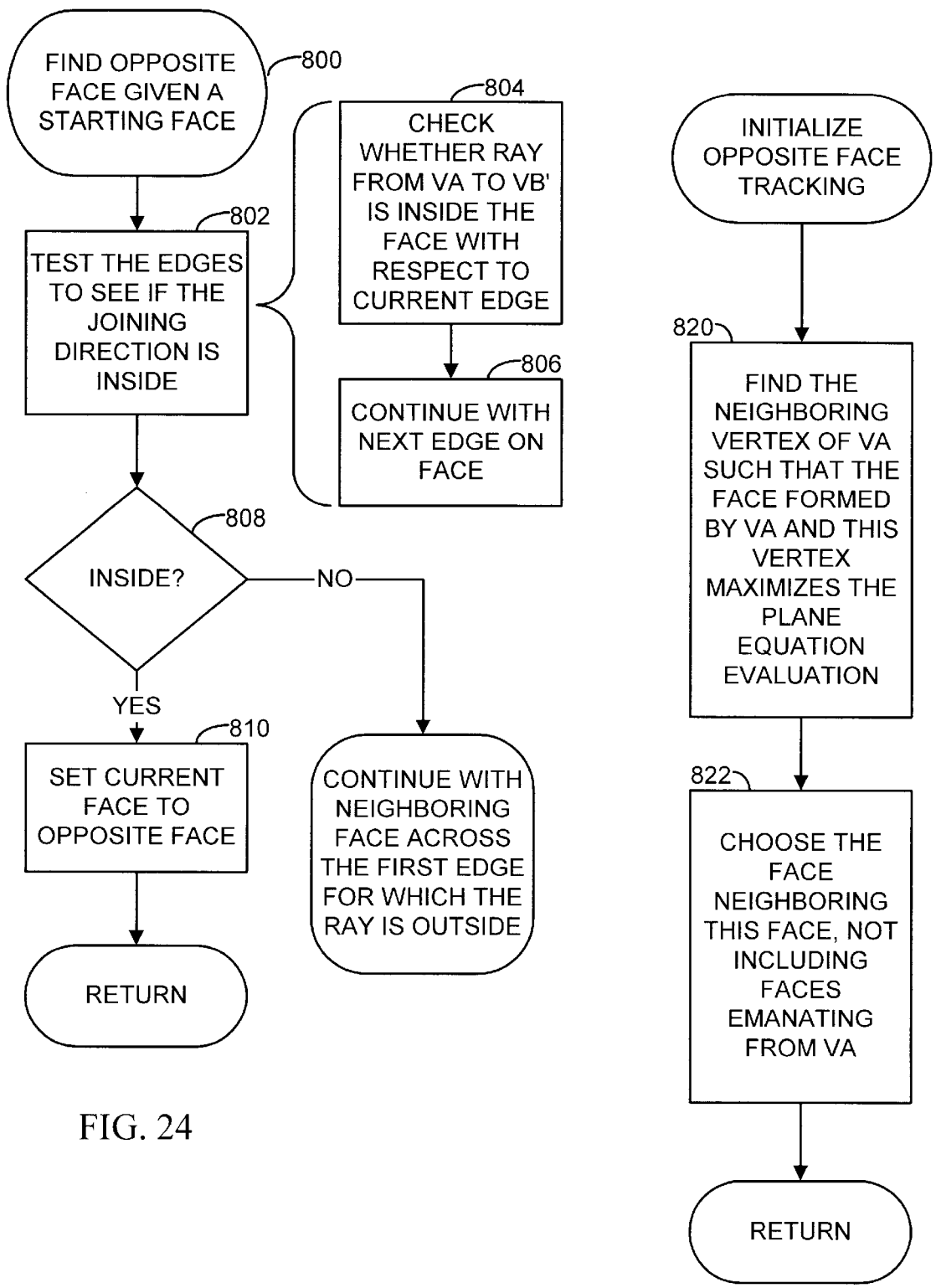
FIG. 24 is a flow diagram illustrating a routine for tracking "opposite" faces of objects as part of a method for tracking persistent intersections of the objects in an animated graphics scene.
FIG. 25 is a flow diagram illustrating steps for initializing the opposite face tracking routine of FIG. 24.

FIG. 24 is a flow diagram illustrating a routine for tracking the opposite face. To find the opposite face given a starting face (800), the routine tests edges of the face to see whether the joining direction is inside or outside (802). This computation is essentially a coherent ray intersection algorithm for convex hulls.

In FIG. 24, the test for determining whether the joining direction is inside or outside (step 802) is broken out into steps 804 and 806. To illustrate these steps, consider the following example for object A. The computation for object B is analogous. In this case, $v_A$ is the extremal vertex on A, and $v'_B$ the extremal vertex on B transformed to A's coordinate system, as shown in FIG. 22. The collision detection routine finds the face that intersects the ray, $R_A$, starting from $v_A$ and continuing in the direction $v'_B-v_A$ (not including faces emanating from $v_A$). Let $v_1$ and $v_2$ be vertices in A that form an edge in the current face, such that $v_1$ to $v_2$ traverses the face counterclockwise as seen from outside A (see FIG. 22). The ray $R_A$ is "inside" the face with respect to the edge $v_1,v_2$ if:

$$((v_1-v_A) \times (v_2-v_A)) \cdot (v'_B-v_A) \geq 0$$

This computation corresponds to the decision block 808 in FIG. 20. If $R_A$ is inside with respect to all the face edges, then the current face is the required opposite face, $F_A$. The routine sets this current face to the opposite face (810). The intersection of $R_A$ with this face at point p forms one extreme of the interior joining segment, $J_A$. Otherwise, the routine iterates by continuing with the neighboring face across the first edge for which the ray is outside as shown by step 812.

If $F_A$ exists but not $F_B$ (i.e., the joining direction is locally inside A but not B), then a test for collision of the hulls is given by testing whether the point $v'_B$ is inside the plane equation $L_A$ of $F_A$. The plane equation $L_A$: $R^3 \rightarrow R$ is defined by $$L_A(P) \equiv N_A \cdot P + d_A$$

where $N_A$ is the outward pointing normal to the face $F_A$ and $d_A$ is a scalar offset. Thus the hulls intersect if $F_A$ exists, and $$L_A(v'_B) \leq 0.$$

Similarly, if $F_B$ exists, then the hulls intersect if $$L_B(v'_A) \leq 0.$$

A more stringent test can be developed if both opposite faces exist, by determining whether the segments $J_A$ and $J_B$ intersect. In that case, the hulls intersect if $$L_A(v_A)N_B \cdot (v'_A-v_B) \leq L_B(v'_A)N_A \cdot (v'_B-v_A).$$

When the joining segment makes a transition from locally outside to inside with respect to object A or B, opposite face tracking must be initialized by choosing a face with which to begin. FIG. 25 is a flow diagram illustrating a routine for choosing a starting face on an object. To initialize opposite face tracking on object A, the routine finds the neighboring vertex of $v_A$ such that the face formed by $v_A$ and this vertex maximizes the result of plane equation evaluation on v'B (820).

Loosely, this finds the face whose plane is closest to $v'_B$. The routine then chooses the face neighboring this face, not including faces emanating from $v_A$ (822). The initialization process is defined analogously for object B.

Opposite face tracking allows persistently colliding situations to be detected coherently, since opposite face tracking is coherent, and interior joining segment intersection implies intersection of the objects themselves.

Silhouette Collision Tracking

Coherent detection of the intersection of silhouettes of a pair of convex objects can be computed by incrementally tracking silhouettes in a each object within a routine for 2D convex polygon intersection. To detect intersections of coherently changing, convex 2D polygons, the collision detection method presented above is applied to the simpler case of polygonal areas in 2D rather than solids in 3D.

As in the case of 3D collision detection, the 2D version of Chung's algorithm iterates over a potential separating direction for the two convex polygons. In this case, the polygons are the projected silhouettes of the convex hulls of the two objects that are to be tested for occlusion. The extremal vertices with respect to the current separating direction, $v_A$ and $v_B$, are maintained on the two polygons as well as the opposite edges: the edges in either convex polygon intersected by the line from $v_A$ to $v_B$, as shown in FIG. 21 B and 21C. For example, in FIG. 21B, the line from $v_A$ to $v_B$ intersects the silhouette polygon A at opposite edge $F_A$ and point $p_A$, and the silhouette polygon B at opposite edge $F_B$ and point $p_B$. Because part of the line is shared between both polygons, they intersect. As in the case of 3D collision detection, an opposite edge exists only if the line from $v_A$ to $v_B$ is locally inside the convex polygon at the respective vertices $v_A$ and $v_B$, as shown in FIGS. 23A and 23B.

The appropriate test for local insideness involves 2D line sidedness, rather than plane sidedness as in the 3D case. Define the operator X on two 2D vectors, a and b, via $$X(a,b) \equiv a_x b_y - a_y b_x.$$

Let u and v be two vertices on a 2D polygon, in counterclockwise order. In other words, the interior of the polygon lies to the left as we move from u to v. Then a point p is inside with respect to the edge from u to v if $L(p,u,v) \leq 0$, where L is defined by $$L(p,u,v) \equiv X(p-u, v-u).$$

To test for local insideness, for example of the point $v_B$ with respect to A's corner at $v_A$, let the clockwise vertex neighbor of $v_A$ on the polygon A be $v_{A^-}$ and it's counterclockwise neighbor be $v_{A^+}$. Then $v_B$ is locally inside if $$L(v_B, v_{A^-}, v_A) \leq 0 \text{ and } L(v_B, v_A, v_{A^+}) \leq 0.$$

This implies $v_B$ is inside both polygon edges emanating from $v_A$. The test for the point $v_A$ with respect to B's corner at $v_B$ is analogous. To test whether an edge of either polygon is intersected by the ray from $v_A$ to $v_B$ (i.e., is an opposite edge), the method simply tests that the vertices of the edge straddle the line equation of the ray. For example, the edge $F_A$ from $F_A.v_1$ to $F_A.v_2$ on A is an opposite edge if $$L(F_A \cdot v_1, v_A, v_B) \leq 0 \text{ and } L(F_A \cdot v_2, v_A, v_B) \geq 0$$

or $$L(F_A \cdot v_1, v_A, v_B) \geq 0 \text{ and } L(F_A \cdot v_2, v_A, v_B) \leq 0.$$

Finally, to test whether the joining segment lies in the interior of both polygons, if the opposite edge $F_A$ exists, then the two polygons intersect if $$L(v_B, v_A \cdot v_1, F_A \cdot v_2) \leq 0.$$

That is, $v_B$ is inside the opposite edge $F_A$. Similarly, the two polygons intersect if $F_B$ exists and $$L(v_A, F_B \cdot v_1, F_B \cdot v_2) \leq 0.$$

If both opposite edges exist, then the polygons intersect if $$L(v_A, F_A \cdot v_1, F_A \cdot v_2) X(F_B \cdot v_2 - F_B \cdot v_1, v_B - v_A) \leq$$
$$-L(v_A, F_B \cdot v_1, F_B \cdot v_2) X(v_B - v_A, F_A \cdot v_2 - F_A \cdot v_2).$$

The silhouette edge of a convex polyhedron can be traced given an initial edge to the next edge in the silhouette. The desired edge is the one for which one adjoining face is "backfacing" with respect to the eye point E and the other is "frontfacing". This is easily checked by substituting E in the plane equations of the respective faces adjoining the edge.

A silhouette edge can be found initially by using the angle minimization discussed above (see the fast occlusion section above) to find a silhouette vertex, and then checking edges emanating from it for silhouettes. As the polygon intersection algorithm moves from vertex to vertex, the silhouette tracer is called to move along the silhouette, either in a clockwise or counterclockwise direction, and the polyhedral vertices converted to 2D by the projection $$x(p) \equiv z_n \frac{(p-E) \cdot X_1}{(p-E) \cdot Z_1}$$
$$y(p) \equiv z_n \frac{(p-E) \cdot X_2}{(p-E) \cdot Z}$$

where $z_n$ represents the near clipping plane Z value and, as before, $(X_1, X_2, Z)$ are three 3D vectors representing the camera coordinate frame.

A complexity arises because the above projection assumes that $$(p-E) \cdot Z \geq z_n$$

that is, points are assumed to be in front of the near clipping plane.

During the silhouette edge tracing procedure, the silhouette collision routine performs clipping to the near plane "on the fly" if it is necessary. This implies that silhouette tracing can follow original edges in the polyhedron or intersections of this polyhedron with the near clipping plane.

Point Inclusion Tracking for Convex Hulls

The section on tracking extents on convex hulls noted that the CVS method uses point inclusion tracking to determine whether the eye point E falls within a hull. It makes this computation to address the branch cut problem while tracking angular extents. Because point inclusion tracking uses opposite face tracking as described in the section on collision detection, the description of it is deferred to this section.

To coherently determine whether a point E is inside a moving convex polyhedron A, the point inclusion routine first transforms E to the local coordinate frame of A yielding the point E'. Point inclusion tracking with respect to E' then proceeds in two phases. First, it finds an "apex" vertex on A, $v_A$, by maximizing the distance to E'. Local ascent along vertices of A does not necessarily reach the vertex which globally maximizes the distance with E'. This does not cause problems, since distance maximization is merely a conditioning step and many vertices of A suffice as an apex.

The distance maximization procedure slides uphill along vertices P of A with respect to the function $$\Re(P) \equiv (P-E') \cdot (P-E')$$

until a local maximum is attained.

The point inclusion routine then tracks the opposite face on A with respect to the ray emanating from $v_A$ through the point E'. This tracking proceeds exactly as described above in the section on tracking persistent intersection of objects. Maximum distance apex tracking is performed so that movements in E' tend to produce the smallest change to the opposite face.

Once the opposite face is found, its plane equation is tested to see whether E' lies inside or outside. If E' is outside, then clearly it is outside A since a point must be inside with respect to all face planes in order to be inside a convex polyhedron. If E' is inside, then it is inside A since the segment from $v_A$ to the opposite face is entirely within the convex object, and E' is in the interior of this segment.

Tracking of the apex vertex and the opposite face are incremental in the sense that the previous apex vertex and opposite face are used as starting points in the tracking algorithms. The search for the next apex vertex or opposite face is short when the body and/or eye point moves only a little.

Implementation Environment of the CVS Method

Figure 26:
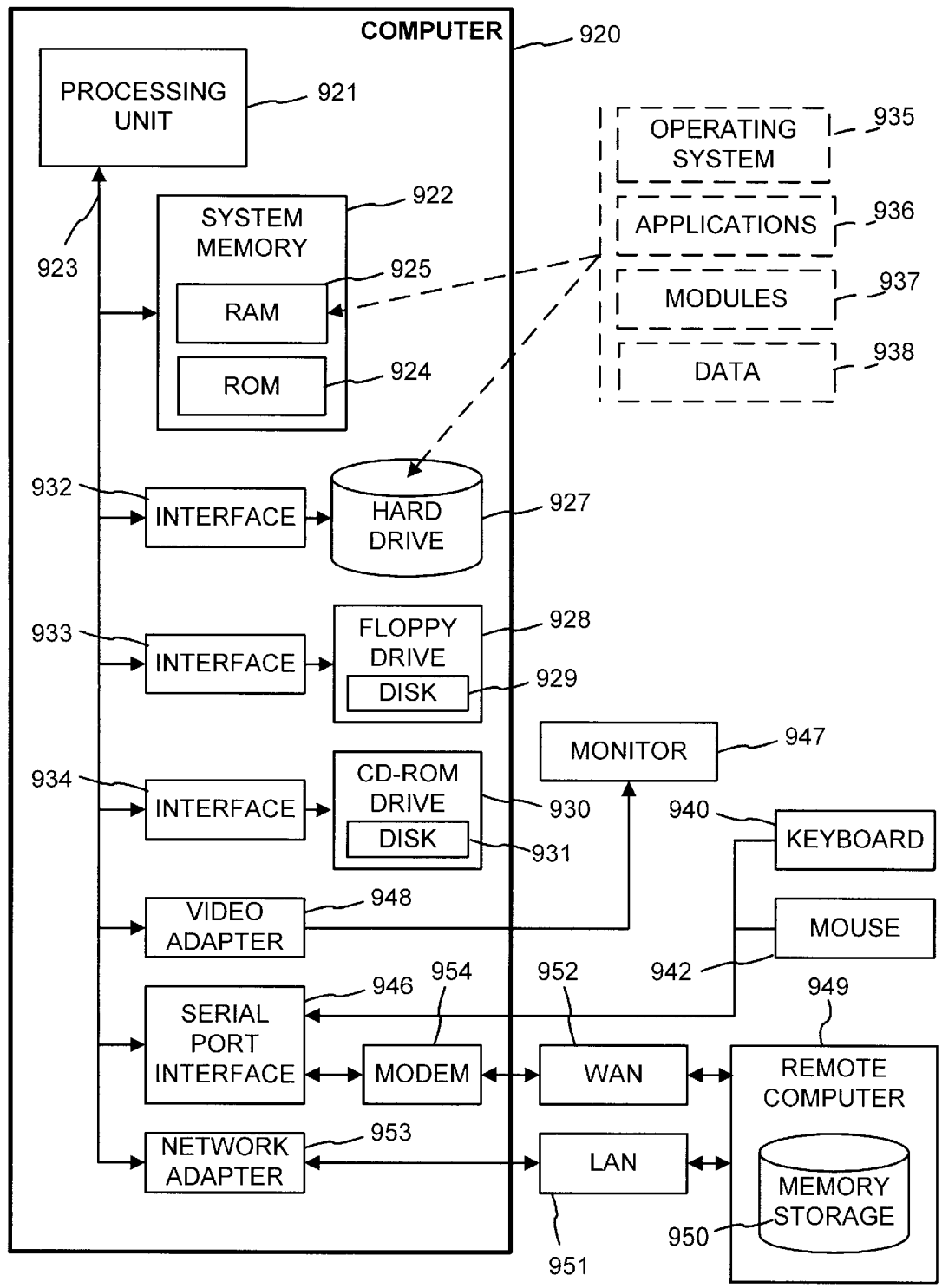
FIG. 26 is a block diagram illustrating a computer system that serves as an operating environment for the coherent visibility sort of FIG. 5.

FIG. 26 and the following discussion are intended to provide a brief, general description of a suitable computing environment in which the coherent visibility sort can be implemented. The CVS method is used as a pre-processing stage for a graphics rendering system. For example, the method can be used to compute a visibility ordering of objects in graphics scenes for a real-time 3D graphics rendering pipeline.

As described above, the CVS method is particularly useful in a real time, layered graphics rendering pipeline where objects can be rendered independently to layers and then composited to form an output image. One implementation of a layered graphics rendering pipeline is described in co-pending U.S. patent application Ser. No. 08/671,412 by Nathan P. Myhrvold, James T. Kajiya, Jerome E. Lengyel, and Russell Schick, entitled Method and System for Generating Images Ufsing Gsprites, filed on Jun. 27, 1996, which is hereby incorporated by reference. This particular rendering system can independently render objects or parts of objects in a scene to separate image layers called sprites.

The CVS method can also be used to compute a visibility ordering for 3D graphics rendering systems that use more conventional frame buffer architectures. Regardless of the underlying rendering architecture for rendering aggregate geometry, the CVS method can use the same approach to compute the visibility sort. The CVS method is preferably implemented in software. It can be incorporated into rendering systems designed for commercially available graphics programming environments such as the OpenGL programming language from Silicon Graphics Corp. or Direct3D from Microsoft Corp.

FIG. 26 shows an example of a computer system for executing the CVS method. The computer system includes a conventional computer 920, including a processing unit 921, a system memory 922, and a system bus 923 that couples various system components including the system memory to the processing unit 921. The system bus may comprise any of several types of bus structures including a memory bus or memory controller, a peripheral bus, and a local bus using any of a variety of conventional bus architectures such as PCI, VESA, Microchannel, ISA and EISA, to name a few. The system memory includes read only memory (ROM) 924 and random access memory (RAM) 925. A basic input/output system 926 (BIOS), containing the basic routines that help to transfer information between elements within the computer 920, such as during start-up, is stored in ROM 924. The computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, other types of media which are readable by a computer, such as magnetic cassettes, flash memory cards, digital video disks, Bernoulli cartridges, and the like, may also be used in this computing environment.

A number of program modules may be stored in the drives and RAM 925, including an operating system 935, one or more application programs (such as the routines of the CVS method) 936, other program modules 937, and program data 938 (the objects, there convex bounding polyhedra, and structures created and maintained by the CVS method). A user may enter commands and information into the computer 920 through a keyboard 940 and pointing device, such as a mouse 942. Other input devices (not shown) may include a microphone, joystick, game pad, satellite dish, scanner, or the like. These and other input devices are often connected to the processing unit 921 through a serial port interface 946 that is coupled to the system bus, but may be connected by other interfaces, such as a parallel port, game port or a universal serial bus (USB).

A monitor 947 or other type of display device is also connected to the system bus 923 via an interface, such as a video controller 948. The video controller manages the display of output images generated by the rendering pipeline by converting pixel intensity values to analog signals scanned across the display. Some graphics workstations include additional rendering devices such as a graphics accelerator that plugs into an expansion slot on the computer or a graphics rendering chip set that is connected to the processor and memory via the bus structure on the mother board. Such graphics rendering hardware accelerates image generation, typically by using special purpose hardware to scan convert geometric primitives.

The computer 920 may operate in a networked environment using logical connections to one or more remote computers, such as a remote computer 949. The remote computer 949 may be a server, a router, a peer device or other common network node, and typically includes many or all of the elements described relative to the computer 920, although only a memory storage device 950 has been illustrated in FIG. 26. The logical connections depicted in FIG. 26 include a local area network (LAN) 951 and a wide area network (WAN) 952. Such networking environments are commonplace in offices, enterprise-wide computer networks, intranets and the Internet.

When used in a LAN networking environment, the computer 920 is connected to the local network 951 through a network interface or adapter 953. When used in a WAN networking environment, the computer 920 typically includes a modem 954 or other means for establishing communications over the wide area network 952, such as the Internet. The modem 954, which may be internal or external, is connected to the system bus 923 via the serial port interface 946. In a networked environment, program modules depicted relative to the computer 920, or portions of them, may be stored in the remote memory storage device. The network connections shown are just examples and other means of establishing a communications link between the computers may be used.

Conclusion

While the invention is described with reference to a specific implementation of the CVS method, it is important to emphasize that the invention is not limited to this implementation. In computing a visibility sort for graphical objects, occlusion detection can be performed using a fast occlusion detection method, an exact occlusion method or a combination of both (e.g., in cases where the fast method fails to reject possible occluders of an object). Note that the collision detection method is only one example of a collision detection routine for moving convex polyhedra. Other methods for detecting collisions between moving convex polyhedra can be used as well.

The above methods use convex bounding polyhedra to detect whether an object potentially occludes other objects. However, it is also possible to perform occlusion detection with respect to the actual objects. To improve performance of the occlusion detection routines, it is possible to pre-specify occlusion detection attributes for an object model at authoring time, rather than compute these attributes at run time (e.g., as a sequence of animation frames are generated). For example, separating planes known to exist between objects at authoring time can be added to an object's specification and used as input to the occlusion detection routines.

The coherent visibility sort is particularly well-suited for animated scenes, i.e., scenes with moving objects and camera. For example, it is fast enough to be used in real time 3D graphics applications where a new output frame is typically generated at least at a rate of 12 Hz and typically near 60 Hz. It exploits coherence by retaining information from one iteration of the sort to the next. This enables the visibility sort to be re-computed efficiently for each frame in a real time animation sequence. In one simulation, the method visibility sorted 200 ellipsoidal objects at 30 Hz, on an SGI Indigo Extreme 2 workstation with a MIPS R4400 processor.

In view of the many possible embodiments to which the principles of my invention may be applied, it should be recognized that the illustrated embodiment is only a preferred example of the invention and should not be taken as a limitation on the scope of the invention. Rather, the scope of the invention is defined by the following claims. I therefore claim as my invention all that comes within the scope and spirit of these claims.

I claim:

1. A method for performing visibility sorting of a list of instances of aggregate geometry in a graphics scene, the method comprising:
    detecting whether an instance of aggregate geometry is occluded by other instances of aggregate geometry in the list;
    detecting an occlusion cycle in a set of instances of aggregate geometry;
    as a result of detecting the occlusion cycle in the set of instances of aggregate geometry, grouping the set of instances of aggregate geometry forming the occlusion cycle into a new instance of aggregate geometry; and
    placing instances of the aggregate geometry, including the new instance having the grouped set of instances of aggregate geometry with an occlusion cycle, into a visibility sorted list based on occlusion tests on the instances of aggregate geometry.

2. The method of claim 1 wherein the step of placing instances of aggregate geometry into a visibility sorted list includes performing a topological sort on an occlusion graph generated by the instances of aggregate geometry.

3. The method of claim 1 further including:
    re-computing the visibility sort for an animated scene; where at least one of the instances of the aggregate geometry is moving by repeating the steps of claim 1 for the instances of aggregate geometry.

4. The method of claim 1 wherein the step of detecting whether an instance of aggregate geometry is occluded by other instances of aggregate geometry in the list includes finding extent intervals of the instances of aggregate geometry and determining whether the extent intervals intersect.

5. The method of claim 1 further including representing the instances of aggregate geometry with convex hull data structures that bound graphical objects in a graphics scene.

6. The method of claim 1 wherein the step of detecting whether an instance of aggregate geometry is occluded by other instances of aggregate geometry in the list includes:
    detecting a collision between instances of aggregate geometry.

7. The method of claim 1 wherein the graphics scene is animated, and further including:
    incrementally tracking changes in position of the instances of aggregate geometry over time to exploit coherence of the animated graphics scene; and
    repeating the steps of claim 1 to re-compute the visibility order of the instances of aggregate geometry.

8. The method of claim 1 further including:
    rendering the instances of aggregate geometry to separate image layers; and
    overlaying the rendered image layers according to the visibility ordered list.

9. The method of claim 3 further including
    re-computing the visibility sort for an animated scene having a moving camera position by repeating the steps of claim 1 for the instances of aggregate geometry.

10. The method of claim 4 wherein the extent intervals comprise spatial or angular extents.

11. The method of claim 10 wherein the extent intervals include spatial and angular extents.

12. The method of claim 4 wherein the visibility sort is re-computed for an animated scene having a moving camera or at least one moving instance of aggregate geometry, and wherein the extent intervals for each recomputation are updated starting with extent data from a previous computation of the visibility sort.

13. The method of claim 6 further including:
    detecting whether an intersection between instances of aggregate geometry persists for more than one-frame.

14. The method of claim 6 further including:
    detecting a collision between silhouettes of the instances of aggregate geometry.

15. The method of claim 14 further including:
    detecting whether a collision between silhouettes of the instances of aggregate geometry persists for more than one frame.

16. The method of claim 7 further including:
    incrementally updating interval extents of the instances of aggregate geometry; and
    testing for intersection of the interval extents to detect whether one instance of aggregate geometry occludes another instance of aggregate geometry.

17. The method of claim 7 further including:
    incrementally tracking a persistent collision of intersecting instances of aggregate geometry as the intersecting instances of aggregate geometry move over time; and
    detecting whether an instance of aggregate geometry occludes another by detecting a collision between the instance of the aggregate geometry and another instance.

18. The method of claim 7 further including:
    incrementally tracking a persistent silhouette collision between instances of aggregate geometry as the instances of aggregate geometry move over time; and
    detecting whether an instance of aggregate geometry occludes another by detecting a silhouette collision between the instance of aggregate geometry and another instance.

19. A method for detecting whether an instance of aggregate geometry occludes other instances of aggregate geometry in an animated graphics scene, comprising:
    determining interval extents of the instance of aggregate geometry;
    incrementally tracking the interval extents as the instances of aggregate geometry change position over time; and
    detecting whether instances of aggregate geometry occlude each other by determining whether the interval extents intersect;
    wherein the interval extents include angular extents;
    wherein the angular extent tracking includes:
    performing vertex descent on vertices of a convex polyhedron representing an instance of aggregate geometry; and
    evaluating a measure of the angular extent at each of the vertices.

20. The method of claim 19 further including:
    beginning with a measure of the angular extent representing a current extreme angular extent value, comparing the measure of the angular extent at neighboring vertices with the current extreme to evaluate whether there is a new extreme angular extent value; and
    deferring computation of a new angular extent until a global extreme is found.

21. The method of claim 20 wherein computation of the new angular extent includes:
computing $$A(P) \equiv \tan^{-1}\left(\frac{(P-E) \cdot Z}{(P-E) \cdot X_1}\right)$$

when a global extreme is found, where E represents the eyepoint, P represents a vertex on the convex hull, Z represents a line of sight direction relative to the eyepoint, and $X_1$ represents a direction perpendicular to the line of sight.

22. A method for detecting whether an instance of aggregate geometry occludes other instances of aggregate geometry in an animated graphics scene, comprising:
determining interval extents of the instance of aggregate geometry;
incrementally tracking the interval extents as the instances of aggregate geometry change position over time;
detecting whether instances of aggregate geometry occlude each other by determining whether the interval extents intersect;
building a kd-tree structure to store the interval extents; and
querying the kd-tree to detect occlusion between instances of aggregate geometry;
wherein the kd-tree structure has nodes that store a subdivided dimension and a partitioning point for the subdivided dimension, and left and right subtrees of the nodes store interval extents located on one side or another of the partitioning point with respect to the subdivided dimension; and
wherein the kd-tree structure is updated after the instances of aggregate geometry change position by computing a new partitioning point, including attempting to find a partitioning point at which the number of interval extents at the left and right subtrees are balanced.

23. The method of claim 22 wherein interval extents that change position with respect to the new partition point are moved to a different subtree, while interval extents that do not change position with respect to the new partition point are maintained in the same subtree.

24. A method for performing visibility sorting of a list of graphical objects in a graphics scene, where the graphical objects each include two or more geometric primitives, comprising:
selecting an object from the list and determining whether the selected object is occluded by other objects in the list;
when the selected object is not occluded by any remaining objects in the list, placing the selected object on a visibility sorted list;
detecting an occlusion cycle among a subset of objects in the list;
as a result of detecting an occlusion cycle among the subset of objects, combining the objects in the subset into a group of occluding objects; and
placing the group of occluding objects back in the list and treating the group as a single object for further visibility sorting.

25. The method of claim 24 including:
detecting the occlusion cycles by representing the objects using convex polyhedra;
computing extents for each of the convex polyhedra; and
checking for overlapping extents to determine whether the convex polyhedra occlude each other.

26. The method of claim 25 further including:
computing a new extent for the grouped subset of objects by taking a union of the extents for the objects in the subset.

27. The method of claim 26 further including:
using the unioned extents to find possibly occluding objects of the grouped subset of objects; and
scanning the possibly occluding objects to check whether each of the possibly occluding objects occludes at least one object in the subset.

28. The method of claim 25 further comprising:
building a tree structure that partitions space into regions based on the extents of each of convex polyhedra; and
searching the binary tree to detect whether the convex polyhedra occlude each other.

29. The method of claim 25 wherein the extents include angular extents.

30. The method of claim 25 wherein the extents include spatial extents.

31. The method of claim 28 where the step of building the binary tree includes:
balancing objects located on either side of a branch in the tree; and
minimizing a number of objects that straddle branches of the tree.

32. The method of claim 24 wherein the step of detecting occlusion cycles includes:
detecting collisions of convex polyhedra that represent the objects.

33. The method of claim 32 wherein the step of detecting occlusion cycles further includes:
tracking opposite faces of convex polyhedra over time as the objects change position to take advantage of coherence in object motion.

34. The method of claim 32 wherein the step of detecting occlusion cycles further includes:
detecting collisions of silhouettes of the convex polyhedra.

35. The method of claim 34 wherein the step of detecting occlusion cycles further includes:
Tracking opposite edges of convex polygons representing silhouettes of convex polyhedra over time as the objects change position to take advantage of coherence in object motion.

* * * * *

UNITED STATES PATENT AND TRADEMARK OFFICE
CERTIFICATE OF CORRECTION

PATENT NO. : 6,266,064 B1
DATED : July 24, 2001
INVENTOR(S) : John Snyder

It is certified that error appears in the above-identified patent and that said Letters Patent is hereby corrected as shown below:

Column 3,
Line 24, "are number" should read -- are a number --.

Column 5,
Line 53, "composited" should read -- composited. --.

Column 6,
Line 18, "Gf" should read -- of --.
Line 20, "runtime" should read -- run-time --.
Line 39, "Graphs The", "*The*" should be the start of a new paragraph.
Line 65, "B. B" should read -- B, B --.

Column 8,
Line 6, "C (126)." should read -- C (126) --.
Line 21, "Detect Cycle" should read -- DetectCycle --.
Line 24, "if a cycle" should read -- if a cycle is found. --.

Column 10,
Line 64, "angulai" should read -- angular --.
Line 65, "a" should read -- an --.

Column 11,
Line 4, "$[\alpha_1, \alpha_1]$" should read -- $[\alpha_0, \alpha_1]$ --.
Line 37, "$[\alpha_0, \alpha_1] \bullet$" should read -- $[\alpha_0, \alpha_1] \cap$ --.
Line 41, "$E \bullet D \bullet [_0, b_1]$" should read -- $E \bullet D \cap [b_0, b_1]$ --.
Line 48, "c==[min" should read -- c≡[min --.

Column 12,
Line 23, "$(a_I, b_i, c_i)$" should read -- $(a_i, b_i, c_i)$ --.

Column 14,
Line 9, "direction need" should read -- direction Z need --.
Line 11, "the n, spatial" should read -- the $n_s$ spatial --.
Line 57, "$\{s_1\}$" should read -- $\{s_i\}$ --.
Line 59, "sorted.)." should read -- sorted). --.

UNITED STATES PATENT AND TRADEMARK OFFICE
CERTIFICATE OF CORRECTION

PATENT NO. : 6,266,064 B1
DATED : July 24, 2001
INVENTOR(S) : John Snyder

It is certified that error appears in the above-identified patent and that said Letters Patent is hereby corrected as shown below:

Column 15,
Lines 3 and 31, "ID" should read -- 1D --.
Line 9, "Id" should read -- 1D --.
Line 11, "$n_i$+0" should read -- $n_l \leftarrow 0$ --.
Line 14, "$c_j \leftarrow |$" should read -- $c_i \leftarrow |$ --.
Line 24, "far," should read -- far. --.

Column 16,
Line 3, "imniediately" should read -- immediately --.
Line 56, "kd tree" should read -- kd-tree --.

Column 17,
Line 24, "thuls" should read -- thus --.

Column 18,
Line 18, "∃[invariant: 3 separating" should read -- [invariant: ∃ separating --.
Lines 35-36, "spatial extents.
         Again, B" should read -- spatial extents. Again, B --. ("Again" should not be the beginning of a new paragraph.)

Column.19,
Line 50, "object" should read -- objects --.

Column 20,
Line 10, "be separating" should read -- be a separating --.

Column 22,
Line 4, "v'B" should read -- $v'_B$ --.
Line 18, "in a each" should read -- in each --.

Colvmn.23,
Line l, "$v_1$" should read -- $v_1$ --.
Line 10, "$v_A$" should read -- $F_A$ --.

Column 25,
Line 41, "there" should read -- their --.

UNITED STATES PATENT AND TRADEMARK OFFICE
CERTIFICATE OF CORRECTION

PATENT NO.      : 6,266,064 B1
DATED           : July 24, 2001
INVENTOR(S)     : John Snyder It is certified that error appears in the above-identified patent and that said Letters Patent is hereby corrected as shown below:

<u>Column 27,</u>
Line 26, "scene; where" should read -- scene where --.

<u>Column 28,</u>
Line 7, "one-frame" should read -- one frame --.

<u>Column 30,</u>
Line 22, "of each of convex" should read -- of each of the convex --.

Signed and Sealed this

Eleventh Day of May, 2004

JON W. DUDAS
*Acting Director of the United States Patent and Trademark Office*